(12) United States Patent
Do et al.

(10) Patent No.: US 6,350,080 B1
(45) Date of Patent: Feb. 26, 2002

(54) MODULAR MOTION STAGES UTILIZING INTERCONNECTING ELEMENTS

(75) Inventors: Khiem Ba Do, Sunnyvale; David F. Arnone, Mountain View, both of CA (US)

(73) Assignee: New Focus, Inc., San Jose, CA (US)

( * ) Notice: Subject to any disclaimer, the term of this patent is extended or adjusted under 35 U.S.C. 154(b) by 0 days.

(21) Appl. No.: 09/644,276

(22) Filed: Aug. 21, 2000

Related U.S. Application Data

(62) Division of application No. 09/013,497, filed on Jan. 26, 1998.

(51) Int. Cl.[7] .................................................. B23Q 1/04
(52) U.S. Cl. .......................... 403/381; 403/13; 269/73; 269/71
(58) Field of Search ................................. 403/381, 382, 403/13, 14, 403; 269/71, 73, 60, 59, 74

(56) References Cited

U.S. PATENT DOCUMENTS

| | | | | |
|---|---|---|---|---|
| 3,046,006 A | * | 7/1962 | Kulicke, Jr. ................. | 269/71 |
| 4,262,891 A | * | 4/1981 | Kinney ........................ | 269/71 |
| 5,173,016 A | * | 12/1992 | Ellison et al. ................. | 269/21 |
| 5,547,330 A | * | 8/1996 | Walimaa et al. ........... | 269/71 X |
| 5,551,795 A | * | 9/1996 | Engibarov ................... | 403/381 |
| 5,716,043 A | * | 2/1998 | Iwata et al. .................... | 269/71 |

* cited by examiner

Primary Examiner—Lynne H. Browne
Assistant Examiner—John R. Cottingham
(74) Attorney, Agent, or Firm—Cary & Kelly, LLP; Charles C. Cary

(57) ABSTRACT

A modular approach to the design of motion modules, e.g., positioning elements, is disclosed which allows a single positioning element to be integrated into a number of multi-axis configurations through combination with other basic positioning elements all of which share a modular interlocking feature. The motion module includes a base and a mobile stage. The base includes an exterior surface on which a first interconnector is located. The mobile stage includes an exterior surface and a second interconnector. The mobile stage is rotary or linearly positionable with respect to the base The second interconnector is located on the exterior surface of the mobile stage, The first and the second interconnector are mutually engagable With second and first interconnectors of other motion modules for stackable interconnection therebetween.

22 Claims, 18 Drawing Sheets

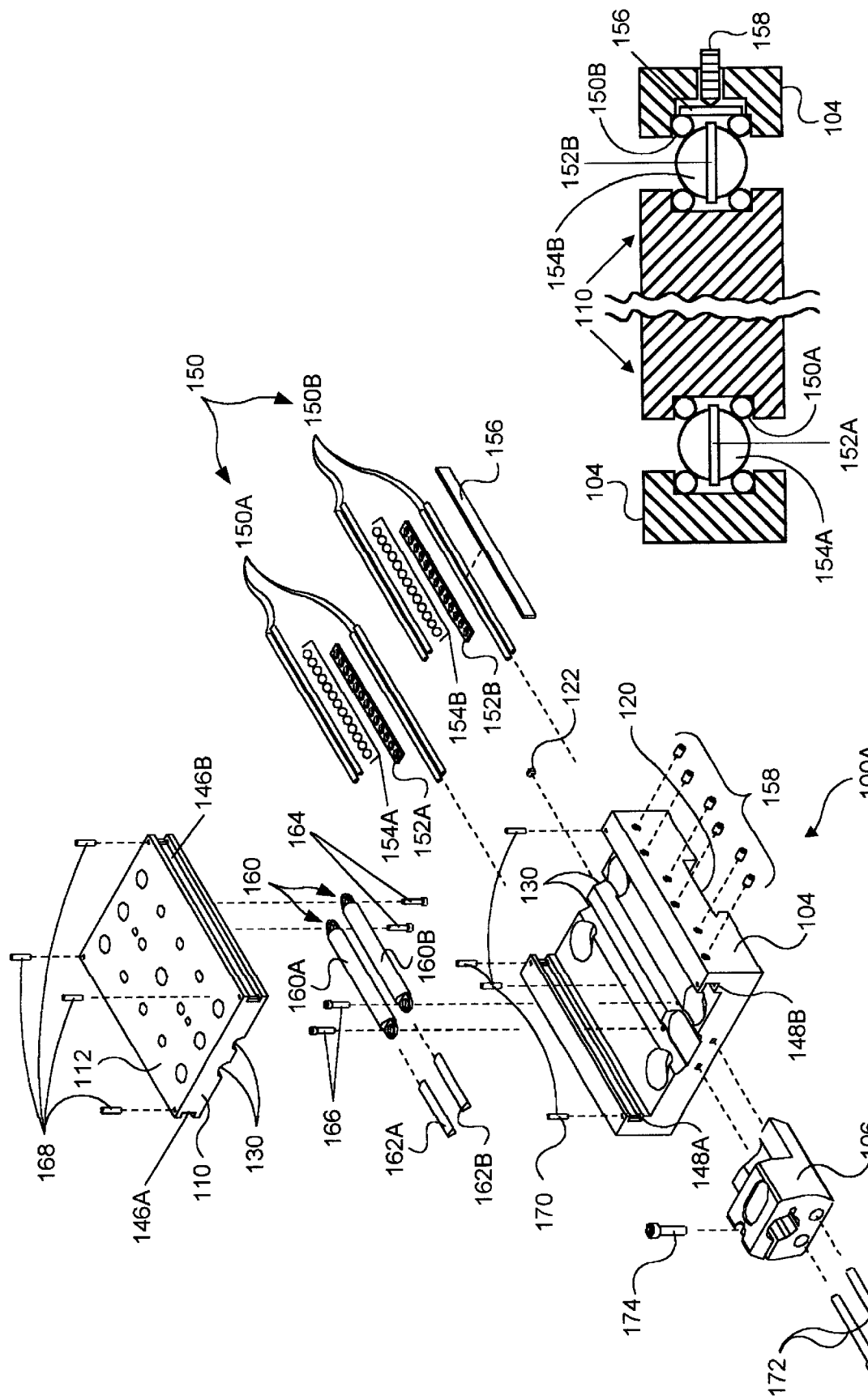

MODULAR MOTION STAGES UTILIZING INTERCONNECTING ELEMENTS

This is a Divisional application of copending prior application No. 09/013,497 filed Jan. 26, 1998, the disclosure of which is incorporated herein by reference.

BACKGROUND OF THE INVENTION

1. Field of the Invention

This invention relates generally to positioning instruments, and particularly to a motion module with interlocking elements to allow stacking with other motion modules, to produce multi-axis positioning instruments.

2. Description of Related Art

The use of adjustable mounting or clamping devices is a common technique for experimental optics, telecommunications, semiconductor inspection and manufacturing, biological probing and sampling, electronic probing and sampling, magnetic probing and sampling and machining. Such mounts are used to position objects, e.g., optical elements, such as light sources and other optical devices. These devices have varying sizes and shapes, and are frequently positioned in close proximity to each other. Separate modules, are used to perform different positioning functions. For example, linear translation stages allow axial movement of an element, rotary translation stages provide for rotation of an element, planarization stages provide tip-tilt for leveling of an element, and goniometers provide for angulation of an object. The modules are expensive due to the high degree of precision with which they are manufactured.

Typically, a customer's needs will vary from experiment to experiment. For example, in one experiment X-axis positioning of an object may be required. In another experiment, combined X-Y axis positioning may be required, in another, experiment X-Y-Z axis positioning may be called for. In still another experiment a combination of X-Z positioning and rotation maybe called for. To achieve each of these positioning objectives the X, X-Y, X-Y-Z, and X-Y-Z+rotation combinations must be purchased as fully assembled integral modules. This of course results in considerable expense and duplicity of investment. A customer may for example own four X-axis positioning elements, one as a stand-alone and the others as integral portions of various multi-axis positioners.

What is needed is a way to reduce the expense duplication, associated with existing multi-axis positioning modules.

SUMMARY OF THE INVENTION

A modular approach to the design of positioning elements is provided. Thus a single positioning element can be integrated into a number of multi-axis configurations through combination with other basic positioning elements all of which share a modular interlocking feature.

In an embodiment of the invention a motion module is disclosed which includes a base and a mobile stage. The base includes an exterior surface, and a first interconnector located on the exterior surface. The mobile stage includes exterior surface and a second interconnector. The mobile stage is positionable With respect to the base. The second interconnector is located on the exterior surface of the mobile stage. The first and the second interconnector are mutually engagable in releasable frictional engagement with second and first interconnectors of other motion modules for stackable interconnection therebetween.

In another embodiment of the invention a system of motion modules for the positioning of objects is disclosed. Each of the motion modules comprises a base, a mobile stage and a positioner. The base includes an exterior surface and a first interconnector. The first interconnector is located on the exterior surface. The mobile stage includes an exterior surface and a second interconnector. The mobile stage is positionable with respect to the base. The second interconnector is located on the exterior surface of the mobile stage. The first and the second interconnector are mutually engagable in releasable frictional engagement with complementary interconnectors of other motion modules for stackable interconnection therebetween. The positioner positions the mobile stage with respect to the base.

In further embodiment of the invention a motion module for the positioning objects is disclosed. The motion module includes a base, a mobile stage, a linear bearing, a bias member, and an adjustable member. The base includes an exterior surface and a first interconnector. The first interconnector is located on the exterior surface of the base. The mobile stage includes an exterior surface and a second interconnector. The mobile stage is positionable with respect to said base. The second interconnector is located on the exterior surface of the mobile stage. The first and the second interconnector are mutually engagable in releasable frictional engagement with complementary interconnectors of other motion modules for stackable interconnection therebetween. The linear bearing slidably affixes the mobile stage to the base to allow linear positioning of the mobile stage with respect to the base. The bias member biases the mobile stage linearly in a preferred direction with respect to the base. The adjustable member includes a handle and a tip. A rotation of the handle produces an extension of the tip. A counter-rotation of the handle produces a retraction of the tip. The adjustable member is affixed to the base with the tip in contact with an end of the mobile stage to counteract the operation of the bias member.

BRIEF DESCRIPTION OF THE FIGURES

FIGS. 1C–D is an exploded isometric view of the modular stage unit shown in FIGS. 1A–B.

DETAILED DESCRIPTION

The current invention provides method and apparatus for combining motion modules so as to allow any combination of translation, rotation, angulation or planarization for objects including optic elements. A motion module includes a base element and a mobile stage. The mobile stage as discussed above can translate, rotate, angulate, and/or planarize in any combination with respect to the base unit. Both the base and mobile stage have defined thereon interconnect features. In an embodiment of the invention, the interconnect feature resembles in cross section, a dovetail. The interconnect feature allows motion modules to be rigidly affixed to one another in any order or combination by means of the interlocking of complementary shapes, e.g., a male dovetail within a female dovetail cavity. The modularization of motion modules in this manner allows a customer with a limited inventory of modules to create a diverse set of multi-axis positionable motion modules. A single motion module may exhibit single or multi-axis rotational and/or translational movement. Motion modules may be combined in multi-axis arrangements to produce multi-axis linear movement in any combination of axis. Motion modules may also be combined in multi-axis arrangements to produce various combinations of arcuate, rotary, planar, and linear motion.

Figure 1A:
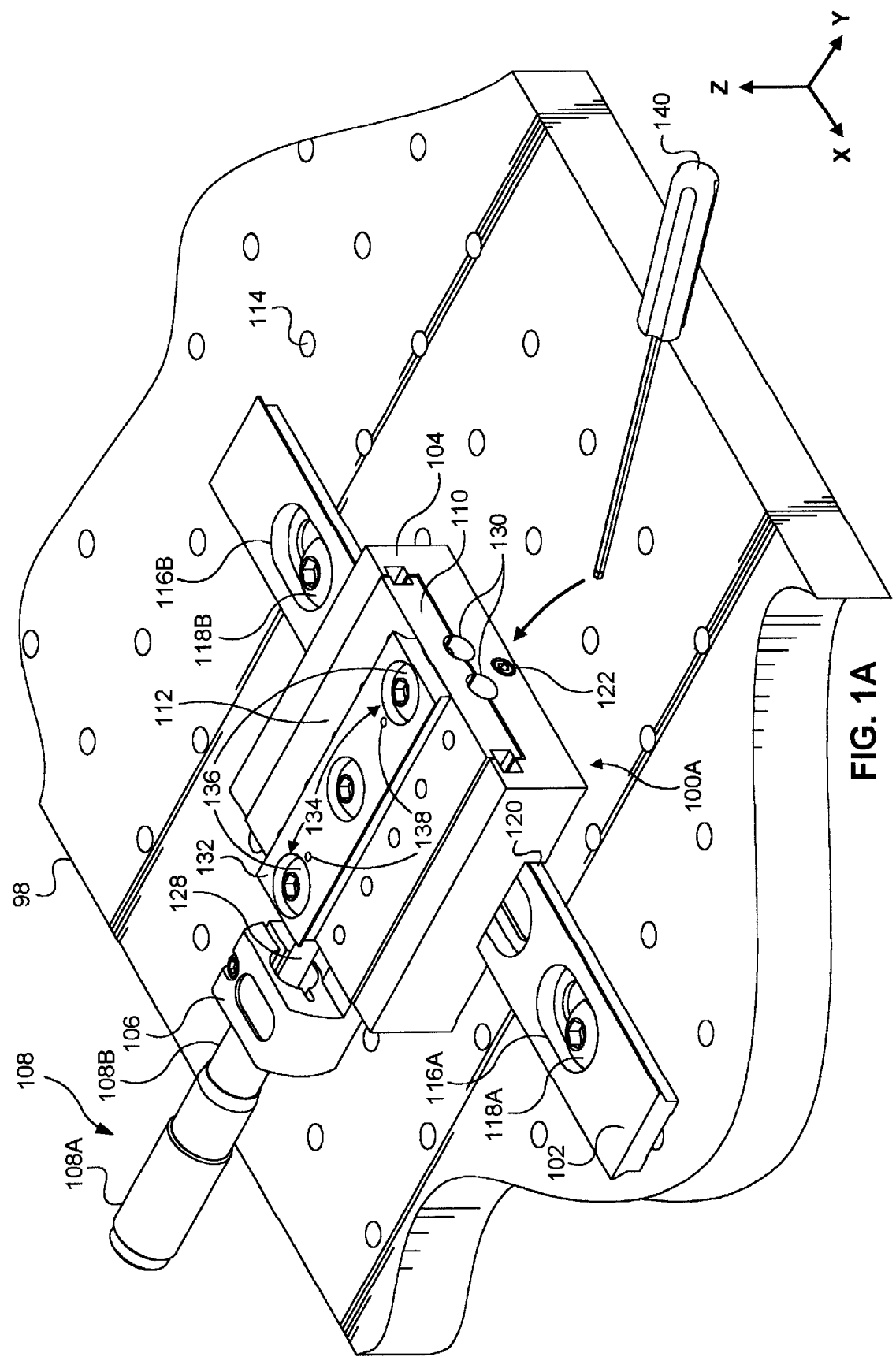
FIGS. 1A–B are isometric views of a modular stage unit mounted to a breadboard and movable along the Y-axis.

FIG. 1A shows an isometric view of a single stage motion module 100A mounted by means of a dovetail 102 to a breadboard 98. The breadboard 98 includes a plurality of mounting holes, of which hole 114 is referenced. The dovetail 102 includes oval counterbores 116A–B and mounting bolts 118A–B. The motion module has a base 104 and a mobile translation stage 110. The base includes a female dovetail cavity 120, a dovetail set screw 122, a clamp 106 a positioner with a handle 108 and a positioner tip 128. The positioner handle includes a rotary portion 108A and a stationary portion 108B. The mobile translation stage 110 includes bias spring bores 130 and dovetail 132. Dovetail 132 includes counterbores 134, fastening bolts 136 and alignment pins 138.

The male dovetail 102 is fastened to the breadboard by means of mounting bolts 118A–B positioned within oval counterbores respectively, 116A–B within the male dovetail. The female dovetail 120 defined within the base 104 of the motion module 100A is positioned astride the male dovetail 102 and rigidly affixed thereto by the clamping action of setscrew 122. The mobile translation stage 110 is slidably affixed to the base 104 by means of linear bearings which will be described and discussed in greater detail in FIG. 1C. Springs positioned within spring bores 130 bias the mobile translation stage in a direction along the negative Y-axis with respect to the base 104. The bias action of the springs causes the mobile translation stage to move along the negative Y-axis with respect to the base 104. The movement of the translation stage is limited by contact with the tip 128 of the micrometer positioner. The micrometer positioner is fixed at its stationary handle portion 108B to the base 104 by clamp 106. The male dovetail 132 is fastened to the upper surface 112 of the mobile translation, stage 110 by means of fastening bolts 136 positioned within counterbores 134. Precise alignment of the male dovetail 132 along the Y-axis of translation of the mobile stage is facilitated by alignment pins 138.

In operation the motion module 100A is rigidly affixed to the breadboard by means of the female dovetail 120 and set screw 122 which cooperatively clamp the male dovetail 102 which is in turn fastened to the breadboard. The set screw is tightened by means of the allen head tool 140. Once clamped to the breadboard, the mobile translation stage 110 can be moved in a precise fashion along the Y-axis by means of the clockwise and/or counterclockwise rotation of the rotary portion 108A of micrometer handle 108, which causes the tip of that instrument to extend and retract with respect to the clamp 106, thereby producing a Y-axis movement of the mobile translation stage 110 with respect to the base 104.

Figure 1B:
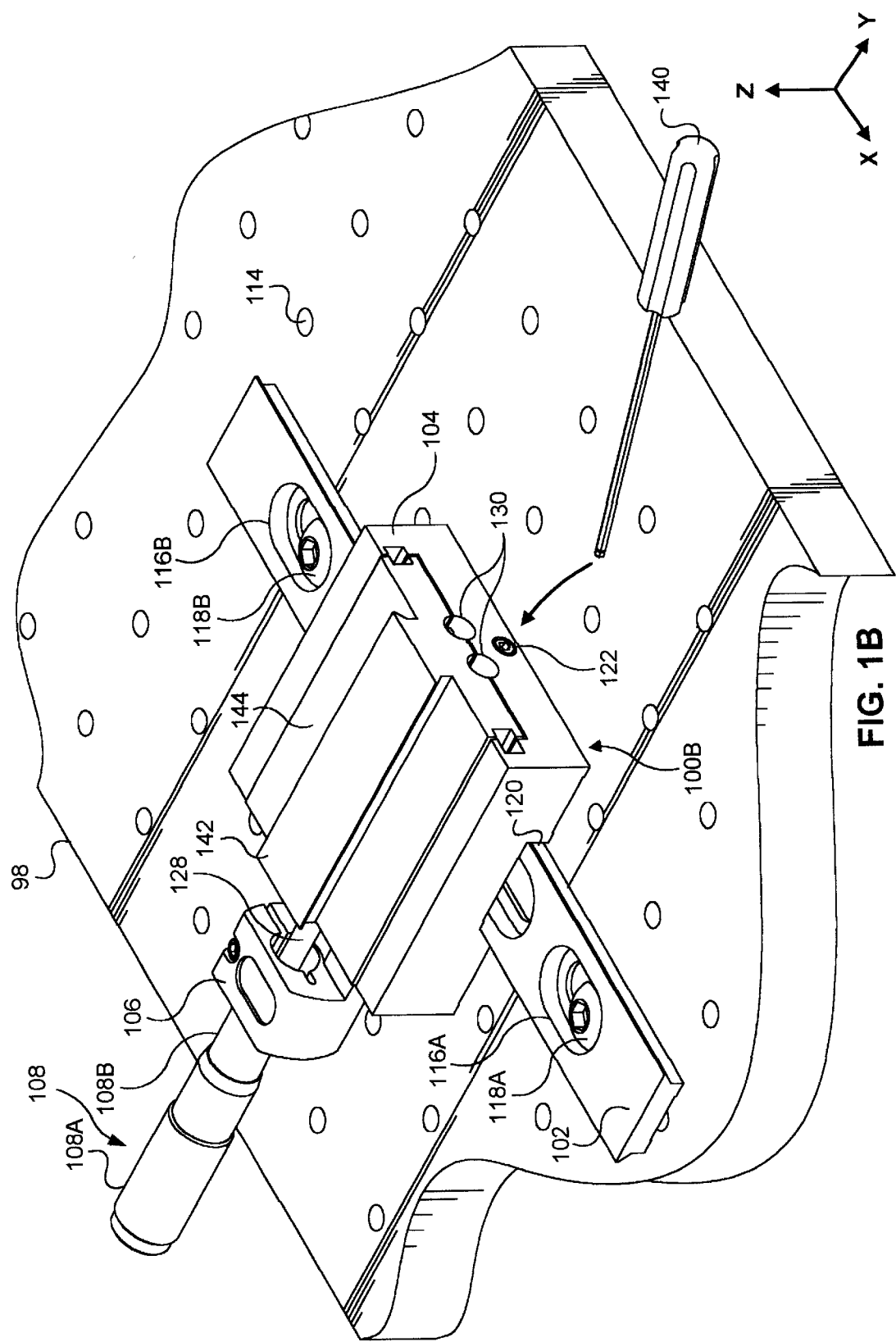

FIG. 1B shows an alternate embodiment of the motion module 100B shown in FIG. 1A. In the embodiment shown in FIG. 1B, the upper surface 144 of the mobile translation stage defines integral therewith a male dovetail 144 which protrudes from the upper surface 144 of the mobile translation stage. In all other respects the motion module 100B shown in FIG. 1B is identical to the motion module 100A described and discussed above in greater detail in connection with FIG. 1A.

FIGS. 1C–D is an exploded view of the motion module 100A discussed above in FIG. 1A. The motion module includes a clamp 106, a base 104, linear bearing raceways 150, bias springs 160 and a mobile translation stage 110. The clamp includes fastening screws 172 and clamp screw 174. The base includes bearing slots 148A–B, female dovetail 120, pre-load set screws 158, dovetail set screw 122 and bearing retention pins 170. The linear bearing raceways 150 include a set of four linear bearing raceways 150A, a set of four linear bearing raceways 150B, ball bearing sets 154A–B, bearing cages 152A–B and pre-load plate 156. The springs 160 include a left spring 160A and a right spring 160B, sponge dampers 162A–B and screws 164–166. The mobile translation stage 110 includes spring bores 130, bearing slots 146A–B, upper mounting surface 112 and bearing retention pins 168. The clamp 106 is held to the base of the motion module by fastener screws 172. The micrometer positioner and specifically a stationary portion 108B [see FIG. 1A.] of the handle is frictionally affixed in clamp 106 by means of clamp screw 174.

The suitable relationship between the mobile translation stage 110 and the base 104 is brought about by the two sets of four linear bearing raceways 150A–B which are contained within respectively, slots, 146A–148A and slots 146B–148B within the base and mobile translation stages. The four linear bearing raceways associated with the base are held in the base raceway slots 148A–B by bearing retention pins 170. Similarly, the four of the eight linear bearing raceways 150A–B associated with the mobile translation stage 110 are affixed thereto by bearing retention pins 168 within bearing slots 146A–B. On the left side of base 104, two of the four linear bearing raceways 150A reside within slot 146A while the remaining two linear bearing raceways 150A are positioned within the left-most slot 146A of the mobile translation stage 110. The opposing pairs of linear bearing raceways slidably engage ball bearing set 154A which is rotatably contained within bearing cage 152A. Similarly, on the right-hand side of the base 104 two of the four linear bearing raceways 105B are affixed within slot 148B while the remaining two linear bearing raceways 150B are affixed within the right-most slot 146B of the mobile translation stage 110 by the corresponding ones among retention pins 168–170. Two of the group of four linear bearing raceways 150B that are contained within slot 146B of the mobile translation stage are slideably positioned with respect to the remaining two linear bearing raceways contained within slot 148A of the base 104. The rotational action of ball bearing set 154B rotatably contained within bearing cage 152B allows for this slidable positioning.

The whole bearing assembly is pre-loaded by set screws 158 which engage pre-load plate 156 within slot 148B and cause that pre-load plate to press against two of the four linear bearing raceways 150B. In response, ball bearing set 154B exerts pressure on the remaining two linear bearing raceways in slot 146B in the mobile translation stage 110. This in turn causes the whole mobile translation stage to move axially across base 104, thereby encouraging slot 146A of the mobile translation stage into closer proximity to slot 148A of the base. Thus, the action of the pre-load plate causes all of the linear bearing raceways 150A–B to achieve more intimate contact with the corresponding balls of ball bearing sets 154A–B.

The bias of mobile translation stage 110 with respect to base 104 is brought about by the action of springs 160A–B. One end of springs 160 distal with respect to clamp 106 is fastened by means of screws 164 to the mobile translation stage 110. The opposing proximal end of springs 160 is attached by means of screws 166 to the base 104. Any action on the part of micrometer positioner tip 128 [see FIG. 1A.] tending to move translation stage 110 in a direction away from clamp 106 is met by a countervailing spring tension which tends to bias the mobile stage in an opposing direction. Because springs 160 are heat treated, they tend to oscillate during translation. This can cause unacceptable noise resulting from contact between the spring and the spring bores 130. To reduce this noise, each spring 160A–B has placed within it a sponge damper, respectively 162A–B to cut down on unwanted vibration.

To assemble the motion module, the sponge dampers 162A–B are placed within corresponding springs 160A–B. An end of both the springs, e.g., the end proximal to the clamp 106 is then fastened by means of screws 166 to the base 104. The mobile translation stage 110 is then placed within the u-shaped cavity defined between bearing slots 148A–B within the base 104. The two bearing assemblies comprising linear bearing raceways 150A–B, ball bearing sets 154A–B, cages 152A–B and pre-load plate 156 are then inserted longitudinally into the corresponding opposing slots 146A–148A and 146B–148B. Next the pre-load set screws 158 are threadably inserted into corresponding holes within slot 148B. These are tensioned against the pre-load plate until all "slop" is removed from the linear bearings. Next the mobile translation stage 110 is slid in a direction away from the clamp 106 a sufficient amount to expose the mounting holes for the distal end screws 164. A tool with a hooked end is inserted into spring bores 130 and used to extract the distal end of springs 160A–B. In the extended position, screws 164 are placed through hooks in the distal end of springs 160A–B. The screws 164 are used to affix these distal ends to the mobile translation stage 110. Subsequently, pressure on the mobile translation stage is released and the tension on springs 160A–B returns the mobile translation stage to a central position with respect to base 104. Next the micrometer is inserted within clamp 106 such that the tip of the micrometer engages the mobile translation stage. At that position clamp screw 174 causes clamp 106 to affix a stationary portion 108B of micrometer handle 108 to the clamp. Subsequently, clockwise and counterclockwise rotation of the rotary portion 108A of the micrometer handle 108 [see FIG. 1A] causes the mobile translation stage 110 to translate linearly with respect to base 104.

Figure 2A:
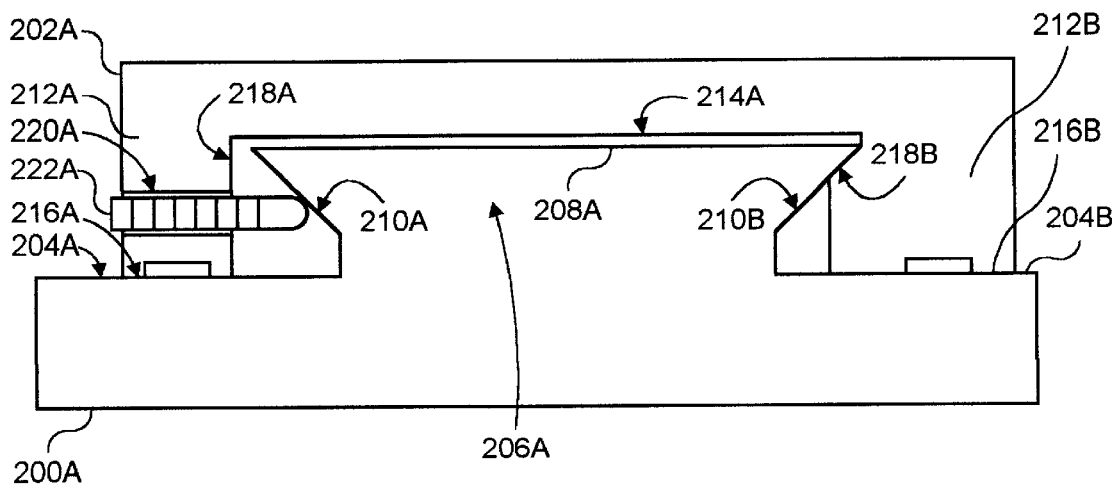
FIGS. 2A–C are cross-section elevational views of three alternate embodiments of the dovetail mounts for the modular stage units shown in FIGS. 1A–B.
Figure 2B:
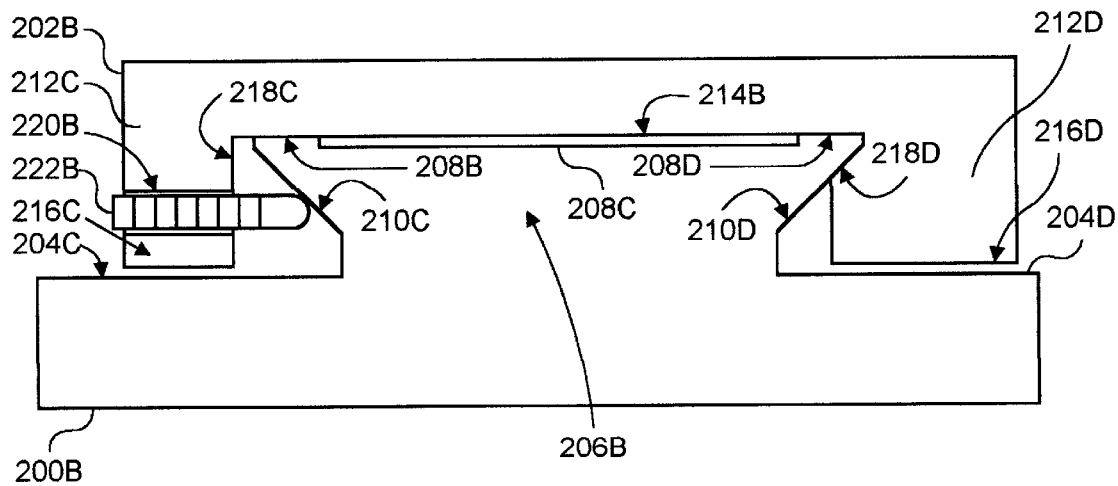
Figure 2C:
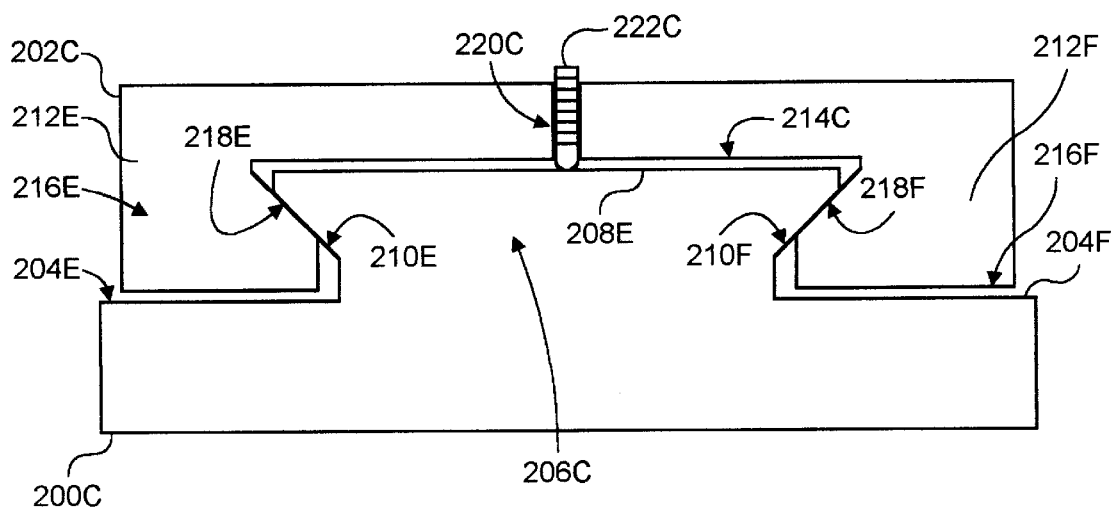

FIGS. 2A–C show alternate embodiments for the interlocking dovetail design of the motion modules of the current invention. Each of the embodiments is distinguishable one from the other on the basis of he surfaces of which the interlocking actions takes place. FIG. 2A shows a male and female base, respectively 200A–202A The male base has an upper surface 204 divided into a left portion 204A and a right portion 204B by an upward protruding male dovetail generally 206A. The male dovetail has an upper surface 208A and inward, sloping left and right surfaces 210A–B The female base 202A has two downward protruding legs 212AB defining between them a generally u-shaped cavity with a base surface 214A and left and right cavity walls 218A–B. The left interior cavity wall 218A is generally orthogonal to the cavity base surface 214A. A portion of the right cavity wall 218B slopes inward at an acute angle with respect to the base surface 214A. The angle of this slope is complementary to the angle formed by the outward sloping face 210B of the male dovetail 206A. A set screw 222A extends through a threaded hole 220A in the left leg of the female base. This set screw is positioned to frictionally engage the outward sloping left face 210A of the male dovetail. As the set screw is tightened, the inward sloping right surface 218B of the female dovetail is drawn into contact with the outward sloping right surface 210B of the male dovetail. In response to the bias action initiated by the set screw, an upper left and right surface 216A–B of, respectively, the left and right legs 212A–B of the female base are drawn into contact with the upper left and right surfaces 204A–B of the male base 200A. In the embodiment shown in FIG. 2A, the wide separation between the clamping surfaces 204A, 216A and 204B, 216B results in accurate horizontal alignment of the female base with respect to the male base.

FIG. 2B shows an alternate embodiment of the male-female dovetail combination. In this embodiment clamping of the male and female dovetail occurs not at the widely separated base and upper leg surfaces shown in FIG. 2A, but rather at the top surface of the male dovetail and the base face of the female cavity. FIG. 2B shows a male and female base, respectively 200B–202B. The male base has an upper surface divided into a left and right portion 204C–204D by an upward protruding male dovetail 206B. The male dovetail has an upper surface generally 208 defined by a left and right portion 208B, 208D between which a recess 208C is defined. The male dovetail has a right outward sloping surface 210D and a left outward sloping surface 210C. The female base has a left and a right downward protruding leg, respectively 212C–D. The left and right leg define between them a cavity, generally u-shaped in cross-section, which has an interior base surface 214B and a left and right interior surface walls 218C–D. The left interior surface wall is generally orthogonal to the base surface 214B. The night interior surface wall 218D is inward sloping at an angle complementary to that of the angle of the outward sloping surface 210D of the male dovetail 206B. The left and right legs 212C–D define at their extremities downward, facing left and right surfaces 216C–D, respectively. A set screw 222B is positioned in the left leg 212C within a threaded hole 220B. The tip of the set screw frictionally engages the outward sloping left surface 210C of the male dovetail. As the set screw is threaded inward, the right inward sloping surface 218D of the female dovetail is brought into frictional engagement with the right outward sloping surface 210D of the male dovetail. Further tightening of the set screw results in a clamping action between the left and right aces 208B, 208D of the male dovetail and the base surface 214B of the female cavity. Thus, in contrast to the dovetail design shown in FIG. 2A, the dovetail design of FIG. 2B exhibits somewhat less accurate horizontal positioning of the female with respect to the male base due to the narrower separation between contact points on the male and female dovetails.

FIG. 2C is another embodiment of the dovetail feature of the current invention. FIG. 2C exhibits perhaps the least accurate horizontal planarization of the male with respect to the female base because in that embodiment resultant clamping action occurs on the angular surfaces of the male and female dovetail. FIG. 2C shows a male and female base, respectively 200C–202C. The male base has left and right upper surfaces, respectively 204E–F between which protrudes a male dovetail generally 206C. The male dovetail has an upper surface 208E and outward sloping left and right surfaces 210E–F. The female base has left and right downward protruding legs 212E–F at the terminus of which is defined left and right downward facing surfaces 216E–F. Between the left and right legs is defined a female dovetail shaped cavity having a base surface 214C, a left inward sloping surface 218E and a right inward sloping surface 218F. The left and right inward sloping surfaces of the female dovetail have an angulation complementary to that of the outward sloping left and right surfaces 210E–F of the male dovetail so as to allow frictional contact between the two. Frictional contact between these two pairs of sloped surfaces is brought about by a set screw 222C positioned in threaded hole 220C within female base 202C. The engagement of the set screw results in contact between the tip of the set screw and the upper surface 208E of the male dovetail. As the set screw is extended, the separation between the upper surface of the male dovetail and the base surface 214C of the female cavity is increased. This increase results in frictional contact between outward sloping surfaces 210E–F. of the male dovetail and the inward sloping surfaces 210E–F of the female dovetail. The planarization between the male and female base in the embodiment shown in FIG. 2C is largely a function of the accuracy of machining of the male and female outward and inward sloping dovetail surfaces. Thus this third embodiment exhibits less potential for planarization of the male and female bases than do either the embodiments in shown in FIG. 2A or 2B.

Figure 3:
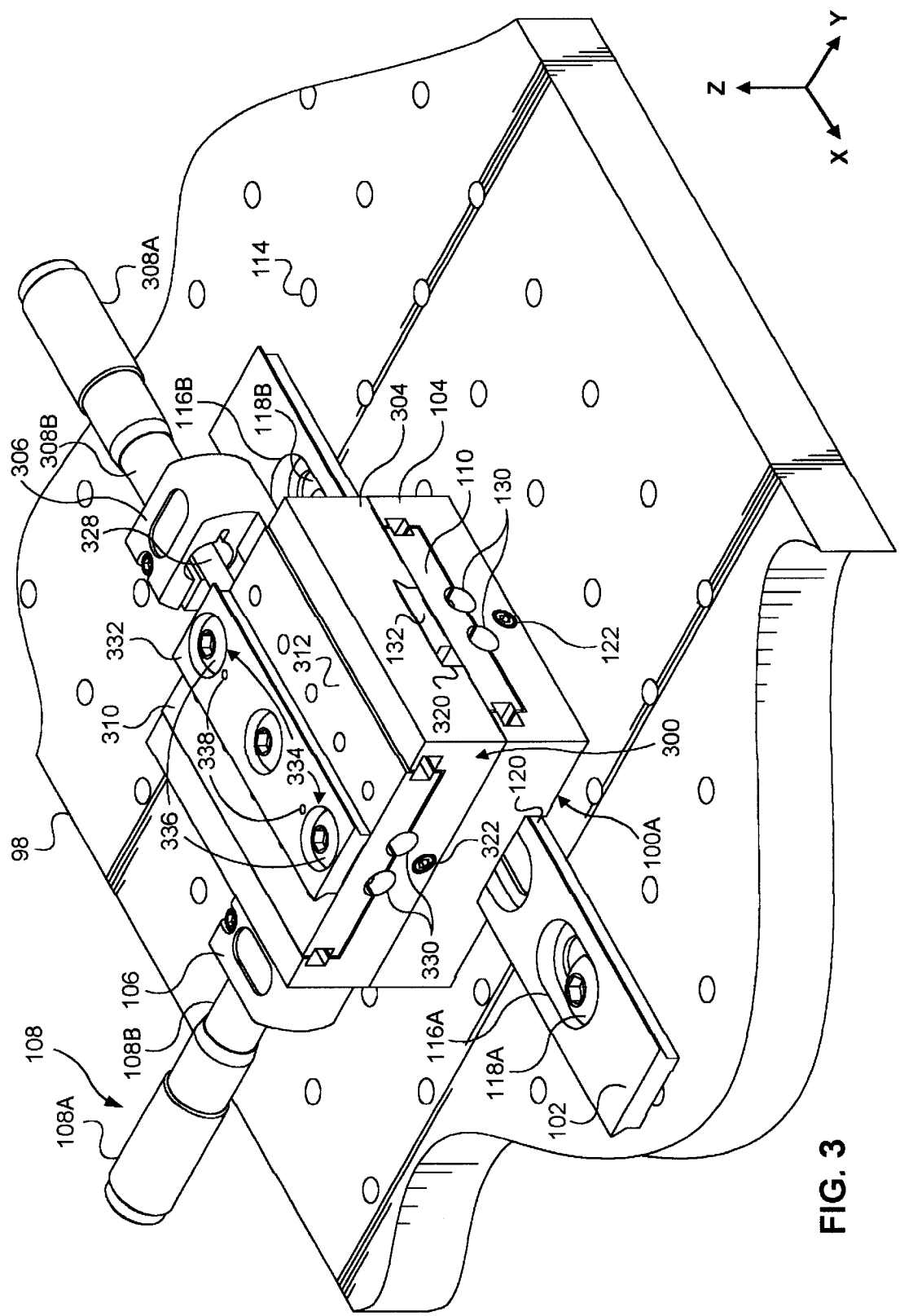
FIG. 3 is an isometric view of two modular stage units movable along the X-axis and mounted to a breadboard.

FIG. 3 is an isometric view of the motion module 100A shown in FIG. 1A with a second motion module affixed thereto. The combination of the motion modules allows translation of an object about both the X and by axis. Breadboard 98, dovetail 102, a first motion module 100A and a second motion module 300 are shown. The breadboard 98, the dovetail 102 and the first motion module 100A. are identical to those described and discussed above in FIG. IA. On the upper most surface of 112 [see FIG. 1A] of the mobile translation stage 110 of the motion module 100A is mounted a male dovetail 132. That dovetail is rigidly affixed to the mobile translation stage 110. The second motion module 300 is rigidly affixed to the first motion module 100A in the manner described and discussed as follows.

The second motion module 300 includes a base 304 and a mobile translation stage 310. The base 304 defines a female dovetail cavity 320. The base also includes a dovetail set screw 322 and spring openings 330. Finally the base includes a clamp 306 and a positioning element with a handle 308 and a tip 328. The mobile translation stage 310 includes an upper surface 312 and a male dovetail 332. The male dovetail includes counterbore holes 334, fastening bolts 336 and alignment pins 338.

Structurally the female dovetail defined within base 304 extends along a longitudinal axis which is orthogonal to the translation access of the mobile translation stage 310. Set screw 322 is extensible within a threaded hole having a longitudinal access orthogonal to the longitudinal axis of the female dovetail and positioned to allow the intersection of the tip of the set screw 322 with an outward sloping surface of the male dovetail 132. The clamp 306 is rigidly affixed by means of fastener screws [not shown] to the base 304. A stationary portion 308B of the positioner is rigidly affixed within clamp 306. In this fixed position the tip 328 of the positioning tool is in contact with an end of mobile translation stage 310. The mobile translation stage 310 is slideably, affixed to base 304 by means of linear bearings similar to those described and discussed above in FIGS. 1C–D in connection with the first motion module 100A The male dovetail 332 is fastened to the upper surface 312 of the mobile translation stage 310 by means of mounting bolts 336 positioned within the counterbore holes 334 within the dovetail. Rigid alignment of the dovetail 332 with respect to the mobile translation stage 310 is achieved by means of alignment pins 338.

To assemble the second motion module 300 atop the first motion module 100A the female dovetail 320 of the second motion module 300 is set astride the male dovetail 132. The male dovetail is itself rigidly affixed to the mobile translation stage 110 of the first motion module 100A Next dovetail set screw 322 is torqued to the point where its tip makes contact with an outward sloping surface of the male dovetail 132, thereby drawing a lower surface of the base 304 of the second motion module into intimate contact with the upper surface 112 [see FIG. 1A] of the mobile translation stage 110.

In operation clockwise and counter clockwise movement of the rotary portion 108A of positioner handle 108 causes the: tip 128 [see FIG. 1A] of that first motion module positioner to move the mobile translation stage 110 in a positive and negative direction along the Y-axis. Translation along the Y-axis is achieved by means of the extension and retraction of the tip 128 [see FIG. 1A.] of the positioner handle 108. Similarly, clockwise and counter clockwise rotation of the rotary portion 308A of the micrometer positioner handle 308 results in translation on the X-axis. When the rotary portion 308A of the handle 308 is rotated in a clockwise direction, the tip 328 of the positioner moves the mobile translation stage 310 along the positive X-axis. Alternately as the positioner handle 308 is rotated in a counter-clockwise direction, the mobile translation stage 310 is drawn by the bias springs within holes 330 in a direction along the negative X-axis thereby maintaining contact with the receding tip 328 of the positioner.

Figure 4A:
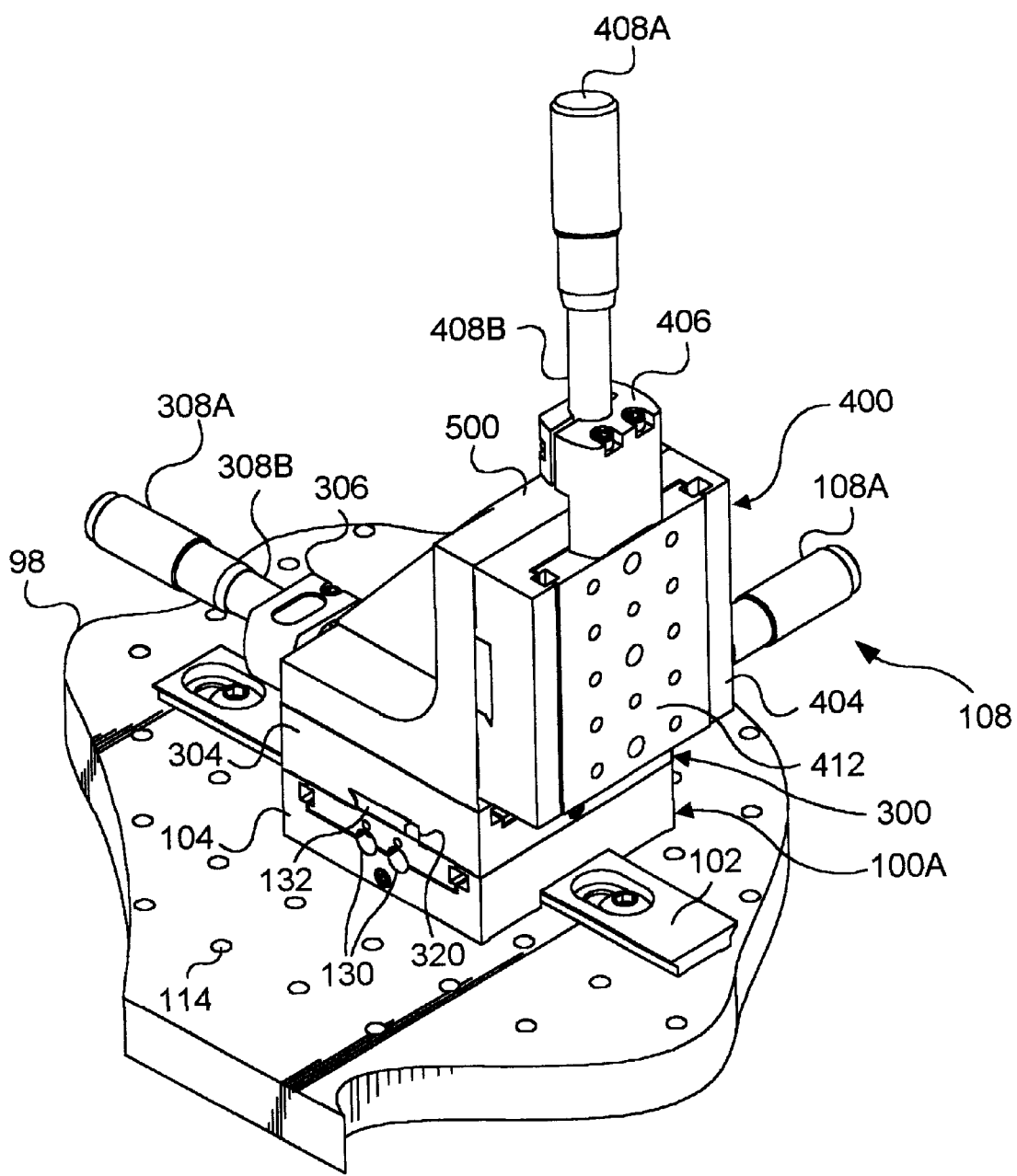
FIG. 4A is an isometric view of three modular stage units mounted to a breadboard and positionable along the X-Y-Z axes.

FIG. 4A is an isometric view of the two motion modules described and discussed above in FIG. 3 onto which is mounted an angle bracket 500 and a third motion module 400. The resultant combination provides axial translation along each of the X-Y-Z axis. The lower surface of angle bracket 500 is rigidly affixed by means of a male dovetail combination to an upper surface of the second motion module 300. A vertical face of the angle bracket 500 is affixed to the base 404 of the third motion module by means of a male-female dovetail combination. The vertical surface 412 of the mobile translation stage of the third motion module, 400 is moveable along a Z-axis by means of clockwise and counter clockwise motion of the rotary portion 408A of the positioner handle 408. The vertical surface 412 is moveable along the Y-axis by means of the clockwise and counter clockwise, rotation-of the rotary portion 308A of the positioner handle 308 of the second motion module 300. Finally the vertical surface 412 is moveable along the positive and negative Z-axis by clockwise and counter clockwise rotation of the rotary portion 108A of the positioner handle 108 which is part of the first motion module. 100A.

Figure 4B:
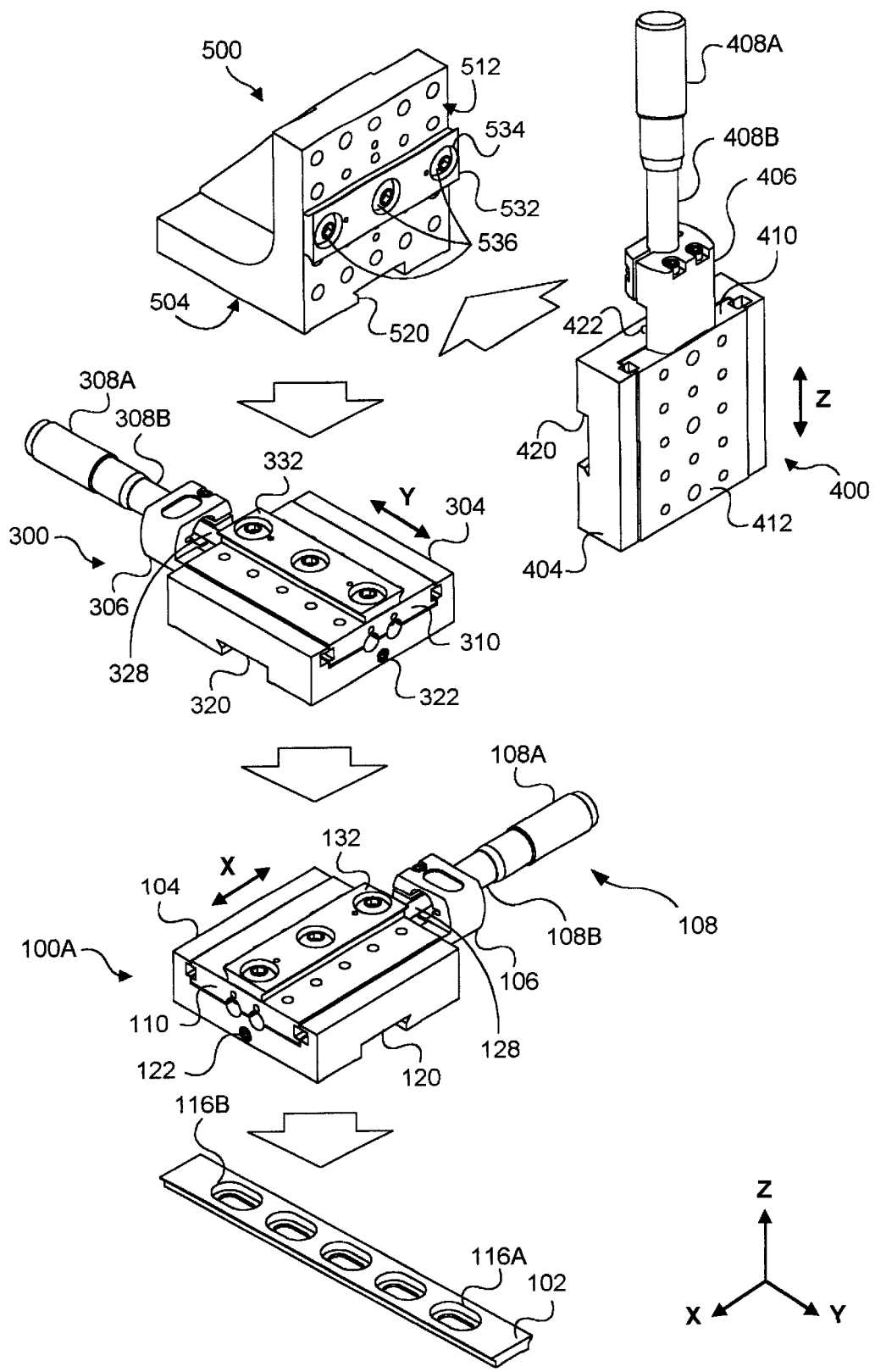
FIG. 4B is an exploded isometric view of the three modular stage units shown in FIG. 4A.

FIG. 4B is an exploded isometric view of the three motion modules in the X-Y-Z-axis translation configuration shown in FIG. 4A. FIG. 413 includes the breadboard dovetail 102, the first, second and third motion modules. respectively 100A, 300 and 400, and the angle bracket 500. Each of the first and second motion modules as well as the angle bracket includes male-female dovetail combinations for affixing each of the motion modules and the angle bracket one to another.

The first and n modules 100A, 300 have been described and discussed in detail above in connection with FIGS. 1A and 3. The angle bracket 500 includes a downward facing surface 504 and a surface 512 at right angles to the downward facing surface 504. Defined within the downward facing surface 504 is a female dovetail 520 which extends along a length of the downward facing surface. To the vertical surface 512 is attached a male dovetail 532. The mile dovetail contains counterbores 534 into which fastening bolts 536 are place to threadably attach the dovetail 532 to threaded holes within vertical surface 512. The third motion module 400 includes a base 404 and a mobile translation stage 410. The base includes a female dovetail 420 and a dovetail set screw 422. The mobile translation stage 410 includes an upper vertical surface 412, a clamp 406 and a positioner handle 408 with a rotatable portion 408A and a stationary portion 408B.

Because of the influence of gravity, the clamp 406 is shown attached to the mobile translation stage 410 rather than the base 404. This is in contrast to both the method of attachment in the first and second motion modules in which the clamps 106 and 306 respectively, are attached to the base. Additionally the bias on the translation stage with respect to the base, is the reverse of the bias discussed above in connection with the first and second motion modules 100A, 300. In the case of the first and second motion modules, the translation stage is biased into contact with the tip 128, 328 of the first and second motion module positioners. In the case of the third motion module 400 the mobile translation stage 410 is biased so as to draw the tip of the positioner handle 408 into contact with the base 404.

The assemblage of the X-Y-Z motion modules is accomplished in the following manner. The female dovetail 120 defined within the base 104 of the first motion module 100A is placed astride the male dovetail 102 which is affixed to the bread board [see FIG. 4A]. Next, set screw 122 is threaded inward until such time as its tip makes contact with an outward sloping surface of male dovetail 102 thereby causing an inward sloping surface of female dovetail 120 to make contact with an opposing outward sloping surface of male dovetail 102. This accomplishes the fastening of the first motion module 110A to the male dovetail 102. Next, the female dovetail 320 defined within the base 304 of the second motion module 300 is placed astride the male dovetail 132. The male dovetail 132 is fixed atop the mobile translation stage 110 of the first motion module 100A. Next, the dovetail set screw 322 is torqued inward to a point where its tip makes contact with an outward sloping surface of male dovetail 132 and in which an inward sloping surface of female dovetail 320 is drawn into contact with the remaining outward sloping, surface of the male dovetail 132. Thus, the second motion module 300 is drawn into rigid contact with the first motion module 100A. Next the female dovetail 520 defined within the lower surface 504 of the angle bracket 500 is placed astride the male dovetail 332. The male dovetail 332 is rigidly fastened to the, top of the mobile translation stage 310 which is part of the second motion module 300. A dovetail setscrew [not shown] is torqued inward through the angle bracket until it contacts an outward sloping surface of dovetail 332 and causes an opposing outward sloping surface of male dovetail 332 to frictionally contact an inward sloping surface of female dovetail 520. Thus, the angle bracket 500 is drawn into fixed contact with the upper surface of the mobile translation stage 310 which is part of the second motion module 300. Next, the female dovetail 420 defined within the base 404 of the third motion module 400 is placed astride the male dovetail 532. The malt dovetail 532 is rigidly fastened to a vertical surface 512 which is orthogonal to surface 504. Then, set screw 422 is torqued to the point where it contacts an outward sloping surface of male dovetail 532 and causes an opposing outward sloping surface of male dovetail 532 to come into frictional engagement with an inward sloping surface of female dovetail 420. Thus, the third motion module 400, is frictionally fastened to the vertical surface 512 of the angle bracket 500.

In operation motion about the X, by and, Z axis of the vertical surface 412 of the mobile translation stage 410 of the third motion module is brought about by respectively, rotational movement of the rotary portions 108A, 308A, and 408A of the positioner handles 108, 308, and 408 of the first, second and third motion modules.

As will be obvious to those skilled in the art, the angle bracket 500 is but one example of a variety of intermediate interconnect units allowing the interconnection of two motion modules. In alternate embodiments, the intermediate interconnects may have interconnect surfaces with a range of angular relationships including orthogonal, i.e. The angle bracket and parallel. An example of a parallel interconnect would be back to back male-male, or female-female, or male-female dovetails. An example of an orthogonal interconnect would be the angle bracket 500 shown in FIGS. 4A–B.

The intermediate interconnect units also allow motion modules with non-complementary interconnects, e.g. male dovetails, on the base and mobile stages to be stacked provided that intermediate interconnect units having complementary interconnects, e.g. female dovetails on their two interlock surfaces, are utilized.

Interlocking Motion Modules

As will be obvious to those skilled in the art, number of interlocking arrangements for the motion modules can be suitably implemented without departing from The teachings of the invention. In addition to those interlocking shapes which resemble a dovetail in cross section, other acceptable cross sectional profiles having an interlocking features include but are not limited to: a "T" shaped male member in a similarly shaped slot, an "L". shaped male member in a similarly shaped slot, a "Y" shaped male member in a similarly shaped slot, an "i" shaped male member in a similarly shaped slot and an tongue shaped male member in a groove.

In each of the embodiments shown, all intermediate motion modules have complimentary male and female cross sectional dovetail shapes on respective the mobile stage and base of each module. As will be obvious to those skilled in the art, this arrangement promotes a high degree of symmetry between each of the motion modules. This arrangement however, is not a prerequisite to the practice of the teachings of this invention. Alternately, for example, identical female cross sectional shapes could be defined in the mobile stage and base portion of one motion module provided only that the motion module to which it is to be attached has complementary shapes at the point of attachment. In still another embodiment motion modules with identical interlocking shapes can be connected with interconnect members which include complementary interlocking shapes. For example, identical female cross sectional shapes could be defined in the mobile stage and base portion of two motion modules to be stacked provided only that an interlocking member with complementary male members was provided to complete the assembly.

The reader will also note, that in the example shown up to this point, the complimentary male and female shapes defined within the mobile stage and base portion of each motion module are disposed along longitudinal axes which are orthogonal one to the other. As will be obvious to those skilled in the art, this feature also promotes a high degree of symmetry between motion modules, but is not a prerequisite to the practice of the current invention. In alternate embodiments, it is possible that the interlocking shapes, e.g., dovetails, defined in the mobile translation stage and the base or in an interconnect member have longitudinal axis which are parallel, rather than orthogonal.

Linear Translation

As will be obvious to those skilled in the art, the linear translation of the mobile stage with respect to the base can be achieved by alternate means to those discussed above in connection with the linear bearing shown in FIGS. 1C–D. Alternate translation mechanisms include linear ball bearings, linear needle bearings, linear roller bearings, sliding low friction surfaces, air bearings, flexure members, maglev, and hydraulic bearings.

Positioning Mechanism

As will be obvious to those skilled in the art, alternate embodiments of the invention include positioning members beside those shown and discussed above in connection with FIGS. 1–4, suitable positioning members include the above mentioned micrometer and in addition thumb screws, set screws, lead screws, piezoelectric, magnetostrictive, linear motors and electromechanical actuators.

Bias Members

As will be obvious to those skilled in the art, alternate embodiments of positioning members, e.g., a lead screw, would not require the spring bias members which are shown in connection with FIGS. 1C–D for biasing the mobile translation stage with respect to the base. A lead screw positioning system for example, may not require a bias member, because the mobile the mobile stage would be captive mechanically in either direction of travel. In addition to those positioning embodiments not requiring a bias member, alternate embodiments of the invention which do require a bias member can utilize alternate bias members. For example, the translation stage could be magnetically biased towards the tip of the positioner. Alternately the bias member could be an electrical device such as a solenoid.

Translation

The motion modules described and discussed above exhibit singly, only one axis of linear the mobile. As will be obvious to those skilled in the art, motion modules incorporating the inventive features described and discussed herein, can be fabricated with multiple axis of either linear and/or rotational motion.

Figure 5:
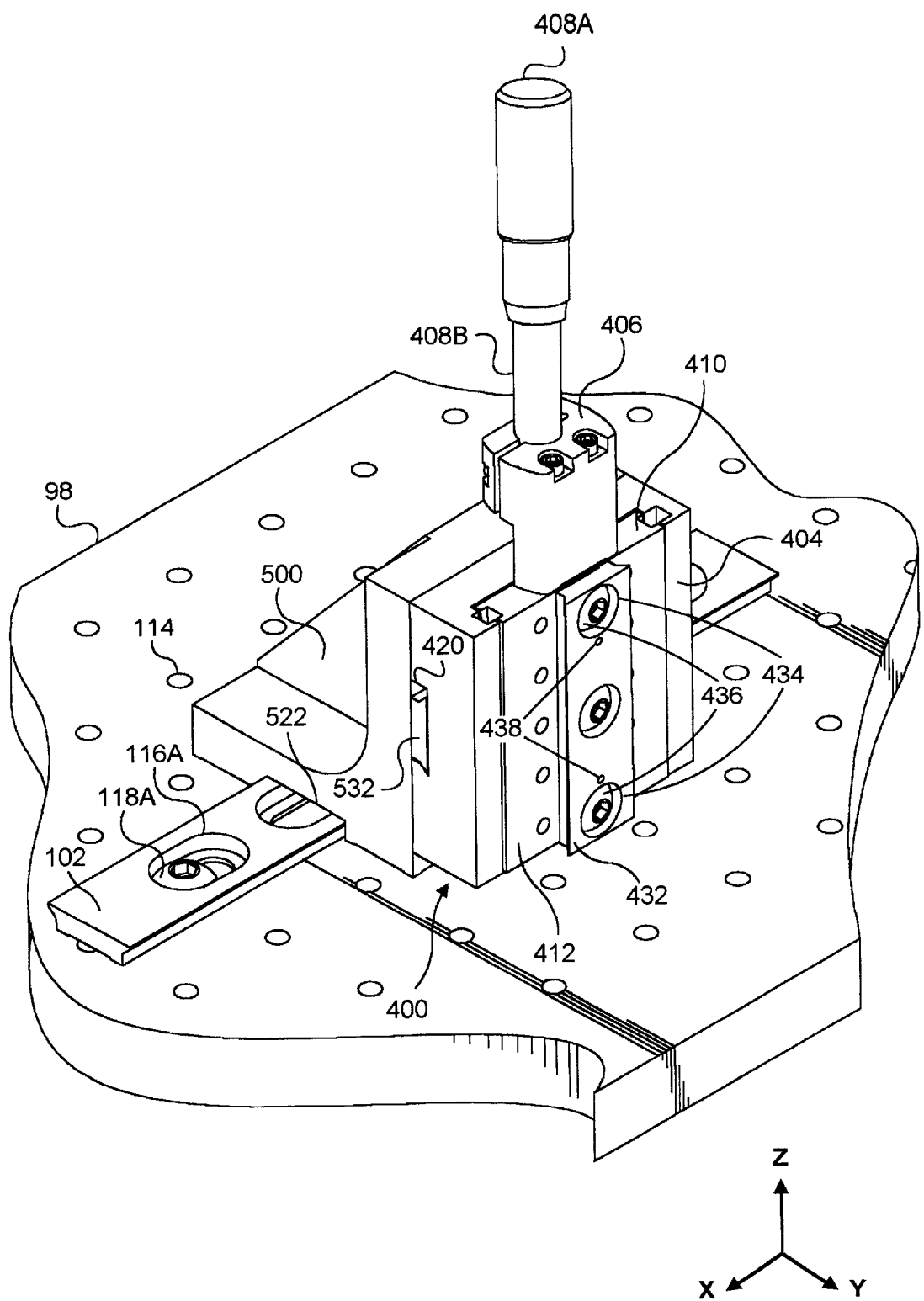
FIG. 5 is an isometric view of a single stage unit positionable along the Z-axis and mounted to a breadboard.

FIG. 5 shows an alternate embodiment of the current invention in which a motion module according to the current invention provides for linear translation along the Z-axis. The breadboard 98, male dovetail 102, modular angle bracket 500 and third motion module 400 are shown. The motion module 400 includes a male dovetail 432 is fastened to the upper surface 412 of the mobile translation stage 410 by means of mounting bolts 436 positioned within the counterbore 434 within the dovetail. Rigid alignment of the dovetail 432 with respect to the mobile translation stage 410 is achieved by means of alignment pint 438. The dovetail 102 is rigidly affixed to the breadboard 98 by means of mounting bolts 118A–B positioned within oval counterbores 116A–B. A female dovetail 522 defined within the lower surface of angle bracket 500 is placed astride male dovetail 102. A dovetail set screw is then torqued to engage its tip with an outward sloping surface of the male dovetail 102 thereby causing the opposing outward sloping surface of the male dovetail to engage an inward sloping surface of female dovetail 522 within the lower surface of angle bracket 500. On a surface orthogonal to the lower surface on the angle bracket, male dovetail 532 is rigidly attached. A female dovetail 420 defined within the lower surface of base 404 is placed astride the male dovetail 532. Then a set screw is torqued through the base 404 until its tip comes into contact with an outward sloping surface of male dovetail 532 causing an opposing outward sloping surface of the male dovetail to frictionally engage an inward sloping surface of the female dovetail 420. Thus, the third motion module 400 is rigidly affixed to the orthogonal face of the angle bracket 500.

In operation the translation about the Z-axis of the mobile translation stage 410 is accomplished by means of clockwise and counter-clockwise rotation of the rotary portion 408A of the positioner handle 408. This rotation causes the tip of the positioner to displace the mobile translation stage 410 with respect to the base 404 along the Z-axis. As discussed above, the bias members, e.g., springs affixed on one end to the mobile translation stage 410 and on the opposing end to the base, continually bias the bp of the positioner into contact with the base 404.

Figure 6:
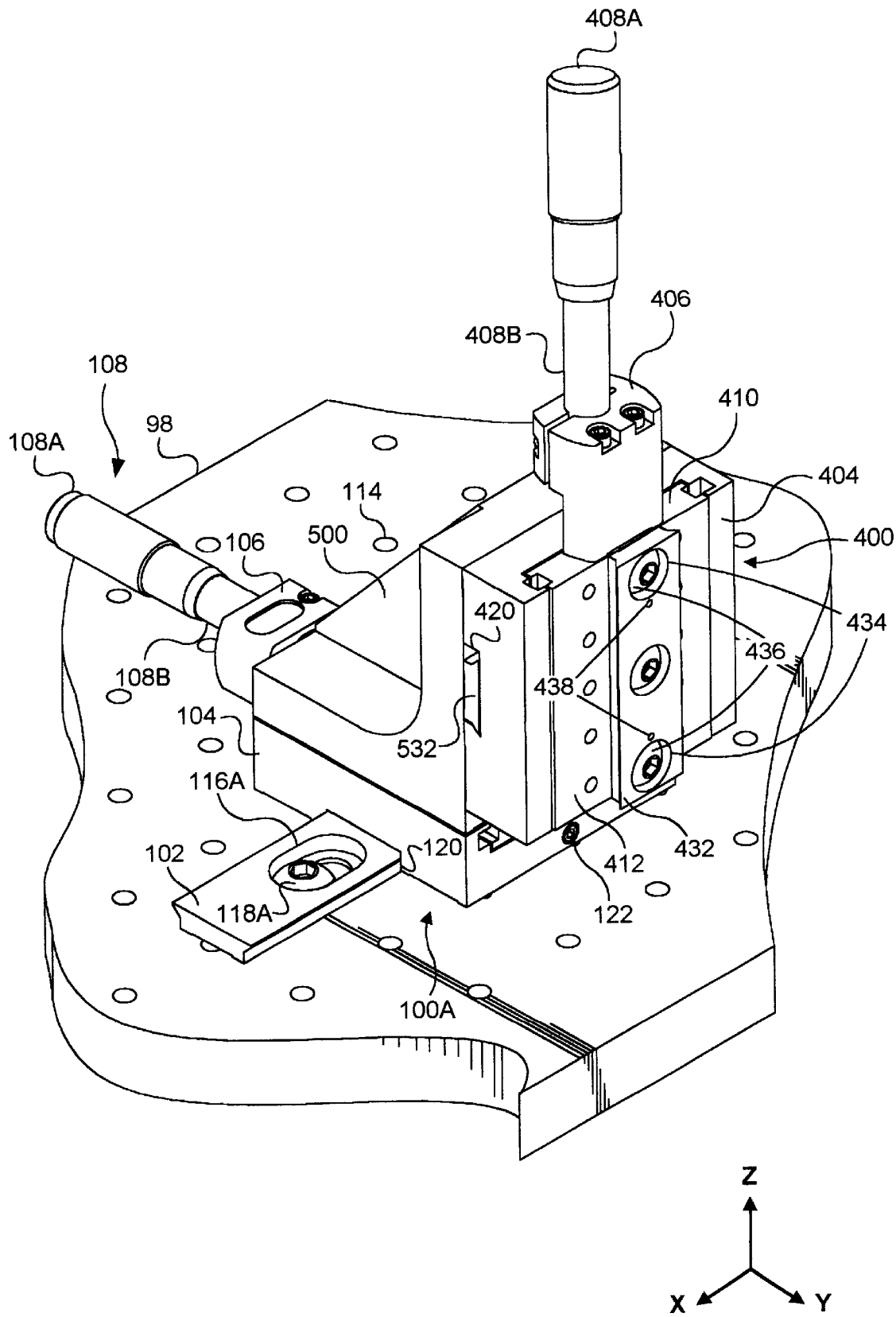
FIG. 6 is an isometric view of two modular stage units positionable along the Y-Z axis and mounted to a breadboard.

FIG. 6 shows an alternate embodiment of the current invention, in which motion modules 100A and 400 are combined with angle bracket 500 to provide linear translation about both the Y and Z axis. The first motion module 100A and specifically the female dovetail 120 defined in the base 104 of that module is placed astride the male dovetail 102. Next, dovetail set screw 122 is torqued so that the tip of the set screw contacts an outward sloping surface of male dovetail 102 and causes an opposing outward sloping surface of male dovetail 102 to frictionally engage in inward sloping surface female dovetail 120. Thus, the first motion module 100 is rigidly affix to the breadboard 98. Next, a female dovetail defined within a lower surface of angle bracket 500 is placed astride a male dovetail on the upper surface of mobile translation stage portion of motion module 100. Then a dovetail set screw [not shown] is torqued until a clamping action between the male and female dovetail surfaces is achieved. Thus, the angle bracket is fastened to the translation stage of the first motion module. Next, a female dovetail 420 defined within the base 404 of the third motion module 400 is placed astride a male dovetail 532 on a vertical surface of the angle bracket. The vertical surface is orthogonal to the base surface of achieved between the main surfaces of the male and female dovetails 532, 420. Thus, the third motion module 400 is rigidly affixed to the vertical face of angle bracket 500.

In operation clockwise and counter clockwise rotation of the rotary portion 108A of the positioning handle 108 of the first motion module 100A results in motion along the Y-axis. Alternately, clockwise-and counter clockwise rotation of the rotary portion 408A of the positioner handle 408 of the third motion module 400 results in motion of the translation stage, 410 along the Z-axis.

Figure 7:
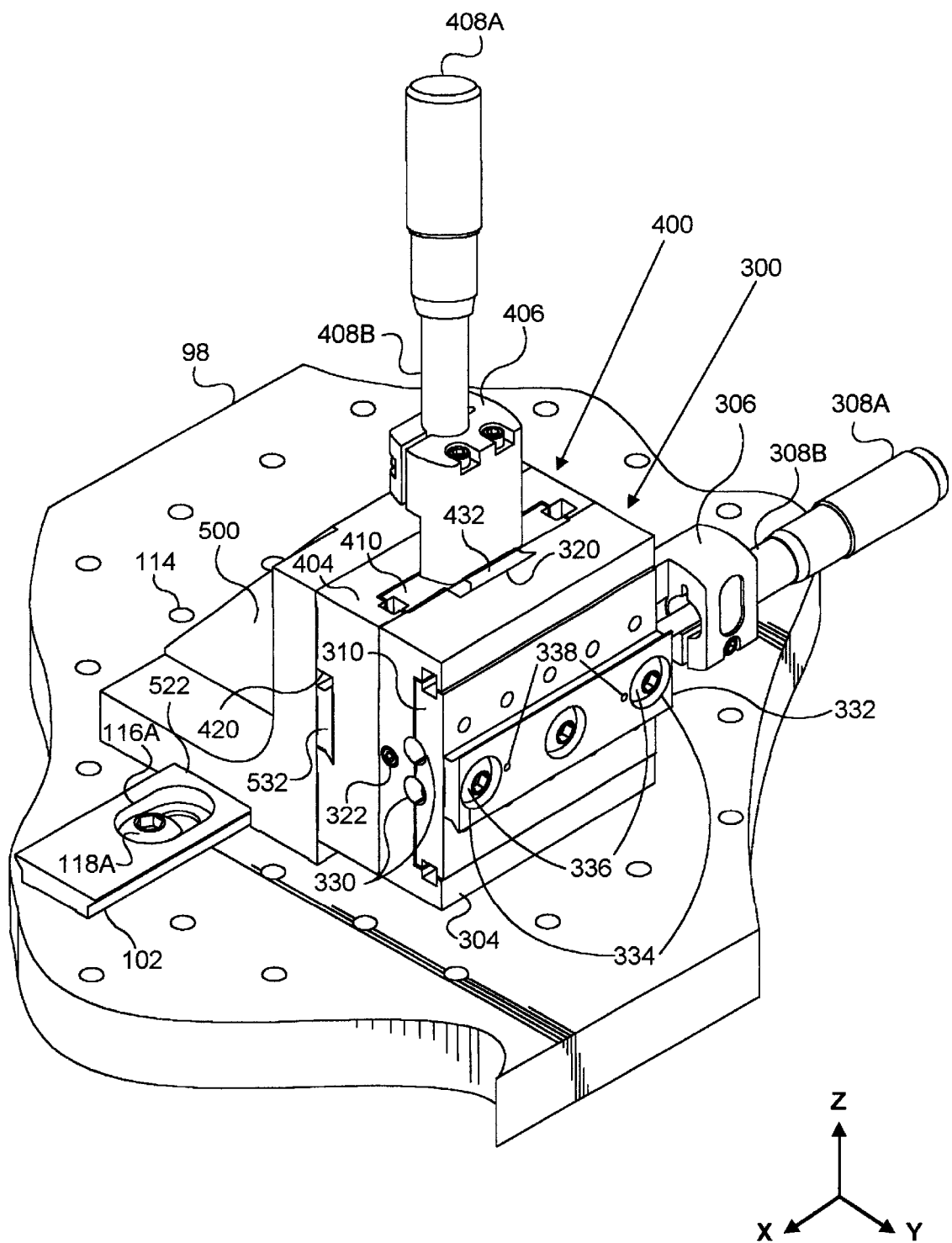
FIG. 7 is an isometric view of two modular stage units positionable along the X-Z axis and mounted to a breadboard.

FIG. 7 shows an alternate embodiment of the current invention in which linear translation about both the Z and X axis is provided. A breadboard 98, a male dovetail 102, an angle bracket 500, a third motion module 400 and a second motion module 300 are shown- A male dovetail 102 is rigidly affixed to breadboard 98 by mounting bolts, e.g., 118A, which are placed within the oval counterbores. e.g., 116A, of that dovetail. Next, a female dovetail 522 defined within a lower surface of angle bracket 500 is placed astride the male dovetail 102. Then a dovetail set screw is torqued until its tip contacts an outward sloping surface of male dovetail 102. This causes a clamping action between the male, and female dovetails 102 and 522. Thus, the angle bracket is firmly affixed to the breadboard 98. Next, a male dovetail 532 is affixes a vertical surface of the angle bracket 500 which is orthogonal to the angle bracket base. Then, a female dovetail 420 defined within the base of the third motion module 400 is placed astride the male dovetail 532. Then, a dovetail set screw is torqued to produce the cooperative clamping action between the male and female dovetails 532, 420. Thus, the third motion module 400 is rigidly affixed to the vertical face of angle bracket 500, Finally, a female dovetail 320 defined within the base 304 of the second motion module 300 is placed astride a male dovetail 432 protruding from the upper vertical surface of mobile translation stage 410 which is part of the third motion module 400. Then dovetail set screw 322 is torqued to produce a cooperative clamping action between the male and female dovetails 432, 320. Thus, the second motion module 300 is rigidly affixed to the third motion module 400.

In operation clockwise and counter clockwise rotation of the rotary portion 408A of the third stage positioner handle 408 produces positive and negative Z axis translation while corresponding rotation of the rotary portion 308A of handle 308 of the second motion module produces linear translation along the X axis of the mobile translation stage 310. The mobile translation stage 310 presents a vertical surface on which is mounted a dovetail 332 and on to which objects such as optical, biological, and electrical components another motion modules can be mounted.

Figure 8:
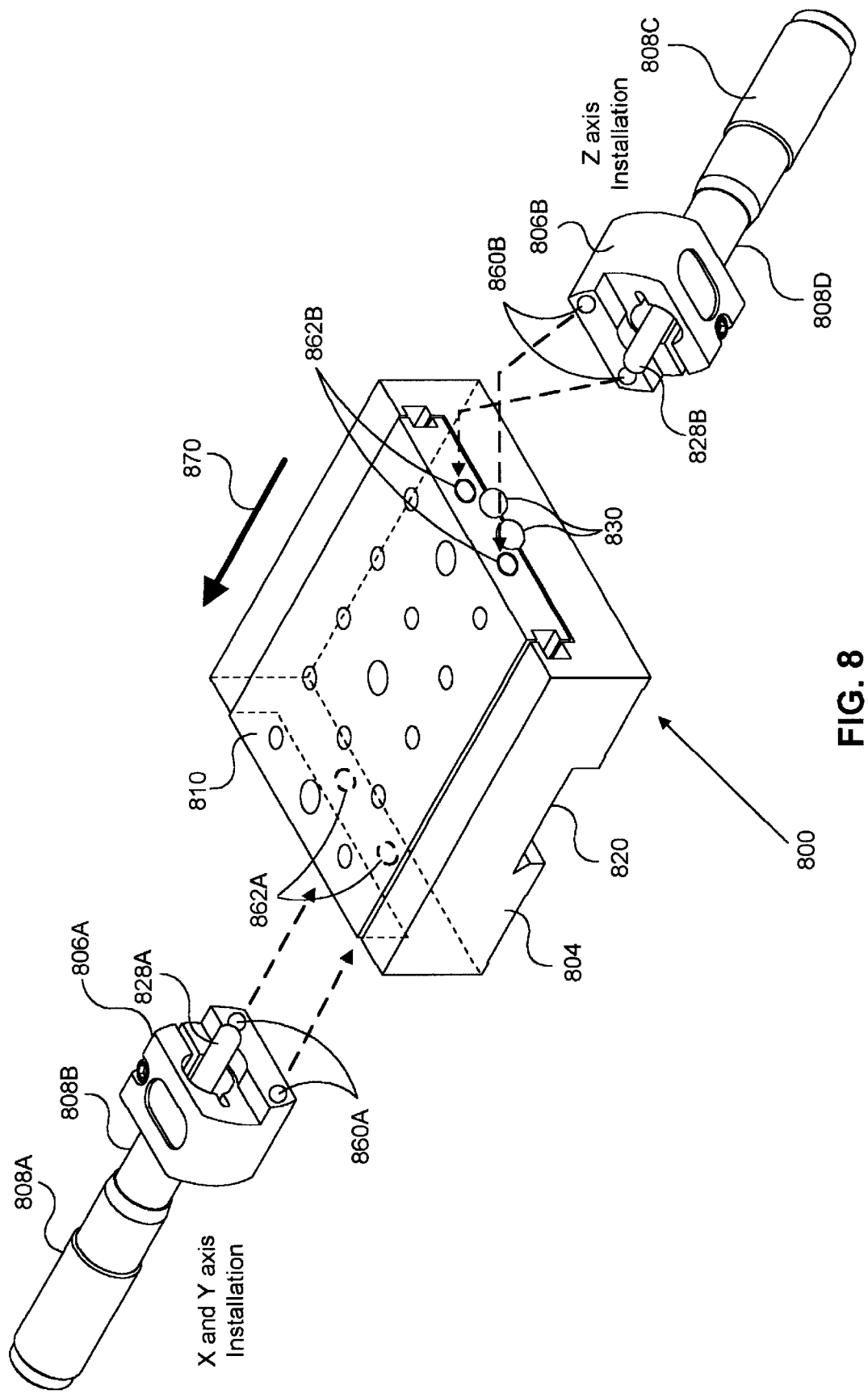
FIG. 8 is an isometric view of a single stage unit showing the appropriate mounting position for an X-Y axis and a Z-axis positioner.

FIG. 8 is a exploded isometric view of a motion module with a positioner attached for X/Y-axis installation or for Z axis installation. In the example shown the Z-axis corresponds to the gravitational axis. The motion module 800 includes a base 804 and a mobile translation stage 810. The base includes a female dovetail 820 and bias spring bores 830. A motion translation stage 810 is biased in the direction shown by arrow 870 with respect to the base 804. The motion module 800 located such that the translation stage 810 moves linearly along either the X or Y axis. In that case it is appropriate to mount the clamp 806A to the base 804. This is accomplished by fastening screws which are placed within holes 860A of the clamp and which threadably engage holes 862A in the base. The holes 862A are in the end of the base toward which the mobile translation stage 810 is biased. A stationary portion 808B of the positioning element is frictionally engaged by clamp 806A. This causes an end of the mobile translation stage 810 to frictionally contact the tip 828A of the positioning element Rotation of the handle portion 808A of the positioner causes the tip 828A to extend and retract thereby causing the translation stage 810 to move linearly with respect to the base 804.

Alternately, the mobile translation stage 810 may be positioned to move parallel to the Z-axis, i.e. gravitational axis. Then, the positioning handle is advantageously attached to the site end of the motion module, and to the mobile translation stage rather than the base. This configuration aligns the gravitational force on the mobile stage and the spring bias force 870 of the mobile translation stage 810. In this configuration the clamp 806B is rigidly affixed to the translation stage 810. This is accomplished by means of fastener screws placed within holes 860B of clamp 806B. The screws threadably engage holes 862B within the mobile translation stage 810. A stationary portion 808D of positioner 808 is fastened by clamp 806B. In this configuration rotation of handle 808C results in positioning pressure from the tip 828B of the positioning element frictionally engages an edge of base 804 and works against both the gravitational and spring bias force 870. This arrangement helps assure that any weakening over time of the bias member should not effect the accuracy, precision, or repeatability of the linear translation and positioning.

Of course this will be obvious to those skilled in the art, a suitably designed bias member which would not experience degradation due to the gravitational force would allow the type of positioning member shown in FIGS. 1–8 to be attached to the base whether the orientation of the linear translation stage was along either the X or Y or Z axis.

Figure 9A:
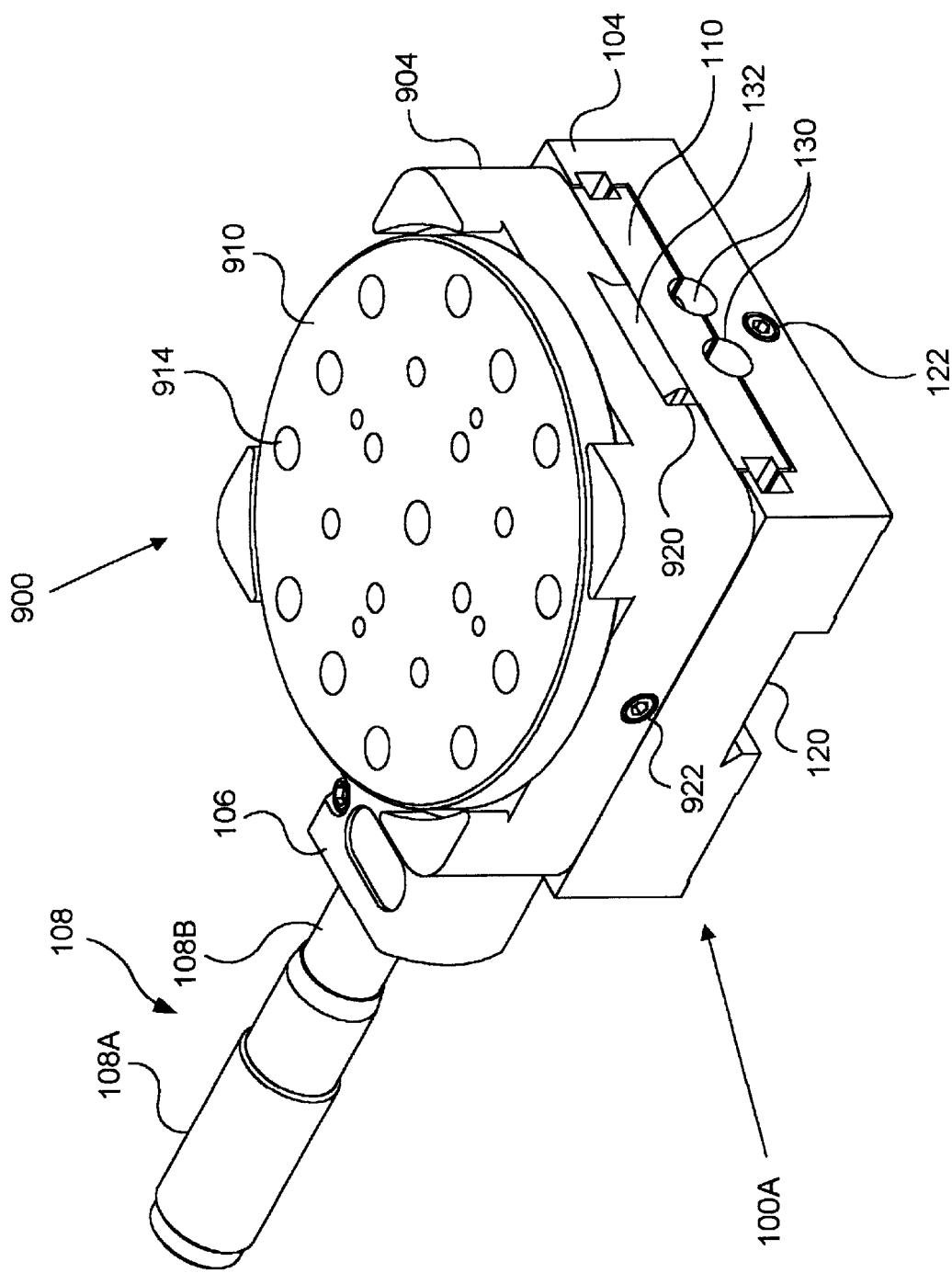
FIGS. 9A–B are isometric views of alternate embodiments of the combination of a rotary and linear modular translation stages according to the current invention.

FIG. 9A shows an alternate embodiment of the invention in which two different types of motion modules are rigidly affixed one to another by means of the interlocking dovetail design of the current invention. Motion modules 900 and 100A are shown. Motion module 100A includes a base unit 104 and a mobile translation stage 110. A female dovetail 120 is defined within base 104 and a male dovetail 132 protrudes from an upper surface of mobile translation stage 110. Motion module 900 provides for rotational movement of a mobile rotational stage 910 with respect to its base 904. Within base 904 is defined a female dovetail 920 and a threaded set screw hole for set screw 922. The upper surface of the mobile rotational stage 9 10 includes fastening holes 914.

Attachment of the rotational motion module 900 to the translational motion module 100A is accomplished in the following manner. The female dovetail 920 defined within base 904 of the rotation motion module 900 is placed astride male dovetail 132. Male dovetail 132 is rigidly affixed to the mobile translation stage 110 which is part of the first translational motion module 100A. Than, set screw 922 is torqued so that its tip comes into contact with an outward sloping surface of male dovetail 132 thereby resulting in an opposing outward surface of male dovetail 132 to come into frictional engagement with an inward sloping surface of female dovetail 920. Thus, the male and female, dovetails and the corresponding motion modules of which they are a part are rigidly affixed one to another.

Figure 9B:
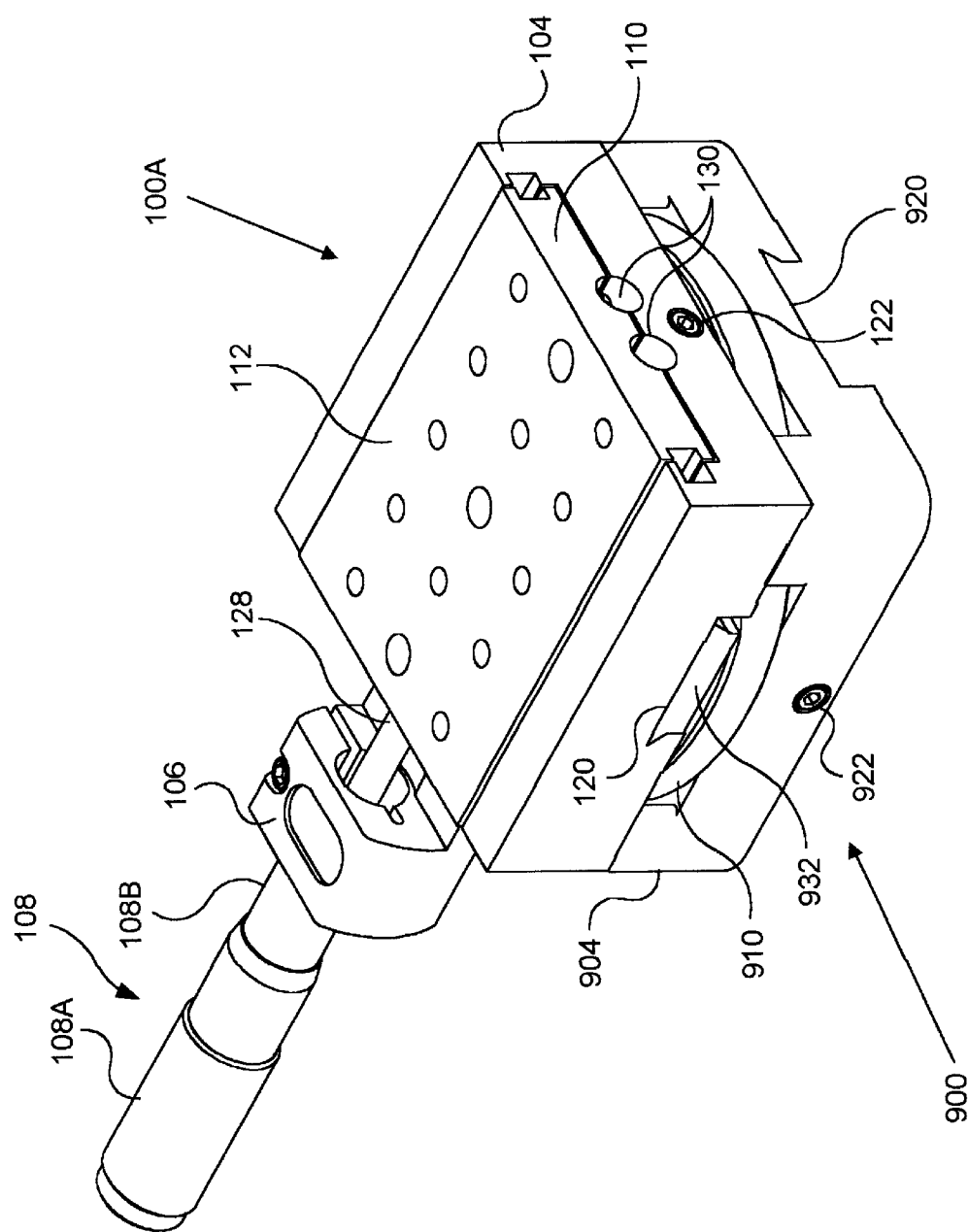

FIG. 9B shows an embodiment similar to that shown in FIG. 9A with the exception that the orientation i.e., upper and lower of the rotational motion module 900 with respect to the translational motion module 100A is reversed. In this embodiment, the translation motion module 100A is mounted on top of the rotational motion module 900.

A male dovetail 932 is rigidly affixed to the mobile rotational stage 910 of the rotational motion module 900. Threaded fastening holes 914 [see FIG. 9A] can be used for this purpose. The female dovetail 120 defined within the base of the first translational motion module 100A is placed astride the male dovetail 932. Then, dovetail set screw 122 in the base 104 of the first translation motion module is torqued to produce a clamping action between the female dovetail 120 and the male dovetail 932. Thus, the first translational motion module is rigidly affixed to the rotational stage of the rotational motion module 900. In this embodiment, translation of the mobile translation stage 110 along the X or Y or any intermediate angulation can be accomplished by means of the rotation of mobile rotational stage 910 and the translation of mobile translation stage 112.

Figure 10A:
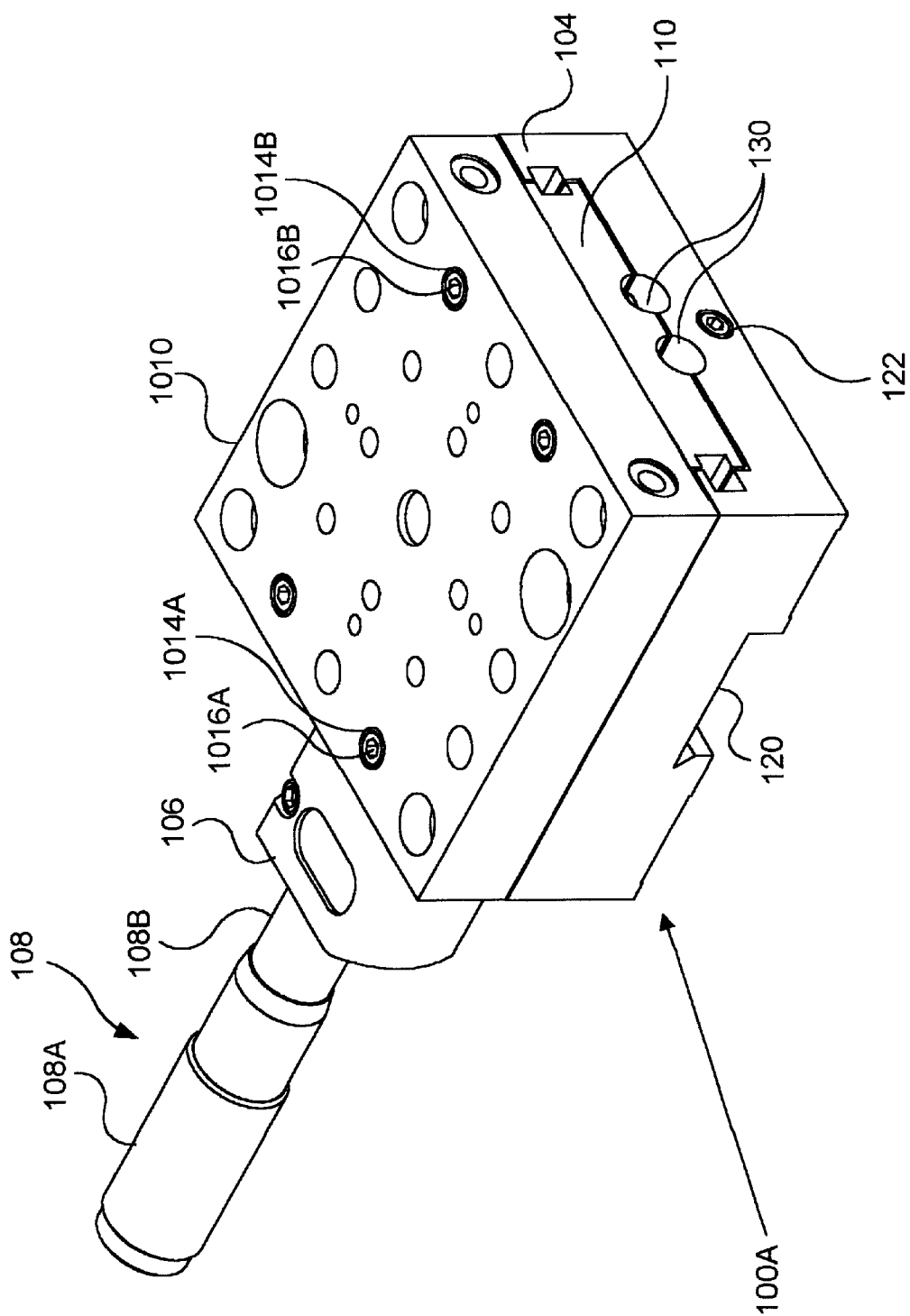
FIGS. 10A–B are isometric views of alternate embodiments including a mounting plate attached to a modular translation stage unit.
Figure 10B:
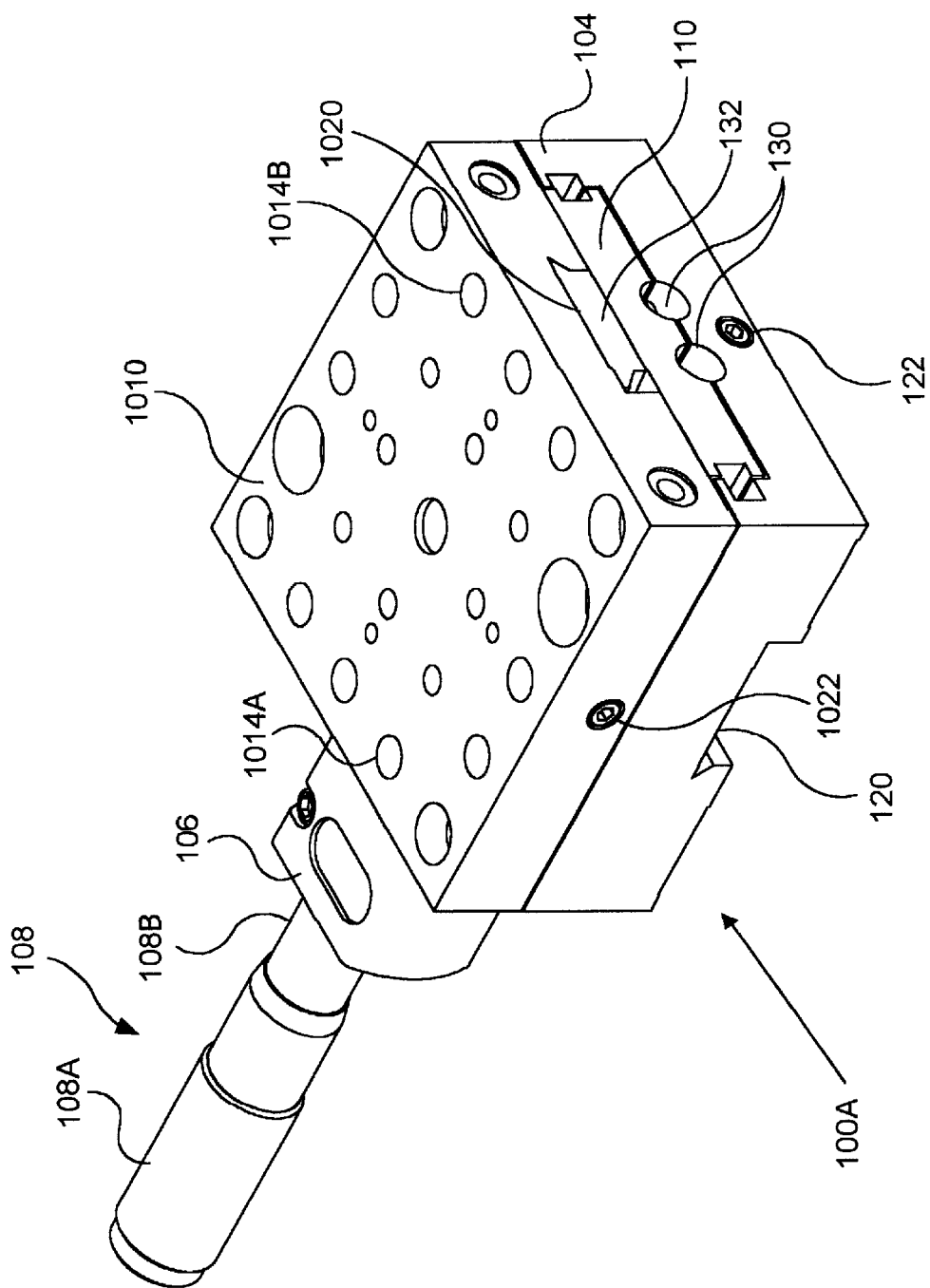

FIGS 10A–B show alternate embodiments for providing a breadboard cap for a motion module. The breadboard cap provides a planar to which a broad range of objects can be attached. FIG. 10A shows the first translational motion module 100A with a breadboard 1010 rigidly affixed to the mobile translation stage 110. Counterbore holes 1014A–B within that cap accommodate allen head set screws respectively, 1016A–B which align with corresponding threaded holes in the mobile translation stage 110 to affix the breadboard 1010 to that translation stage.

In FIG. 10B the breadboard 1010 defines within its lower surface a female dovetail 1020. That female dove is placed astride a male dovetail 132 rigidly affixed to the mobile translation stage 110 of the first translational motion module 100A. Subsequent torquing of dovetail set screw 1022 causes a cooperative clamping action between male dovetail 132 and female dovetail 1020. Thus fastening the breadboard 1010 to the mobile translation stage 110 of the first translation motion module 100A.

Figure 11:
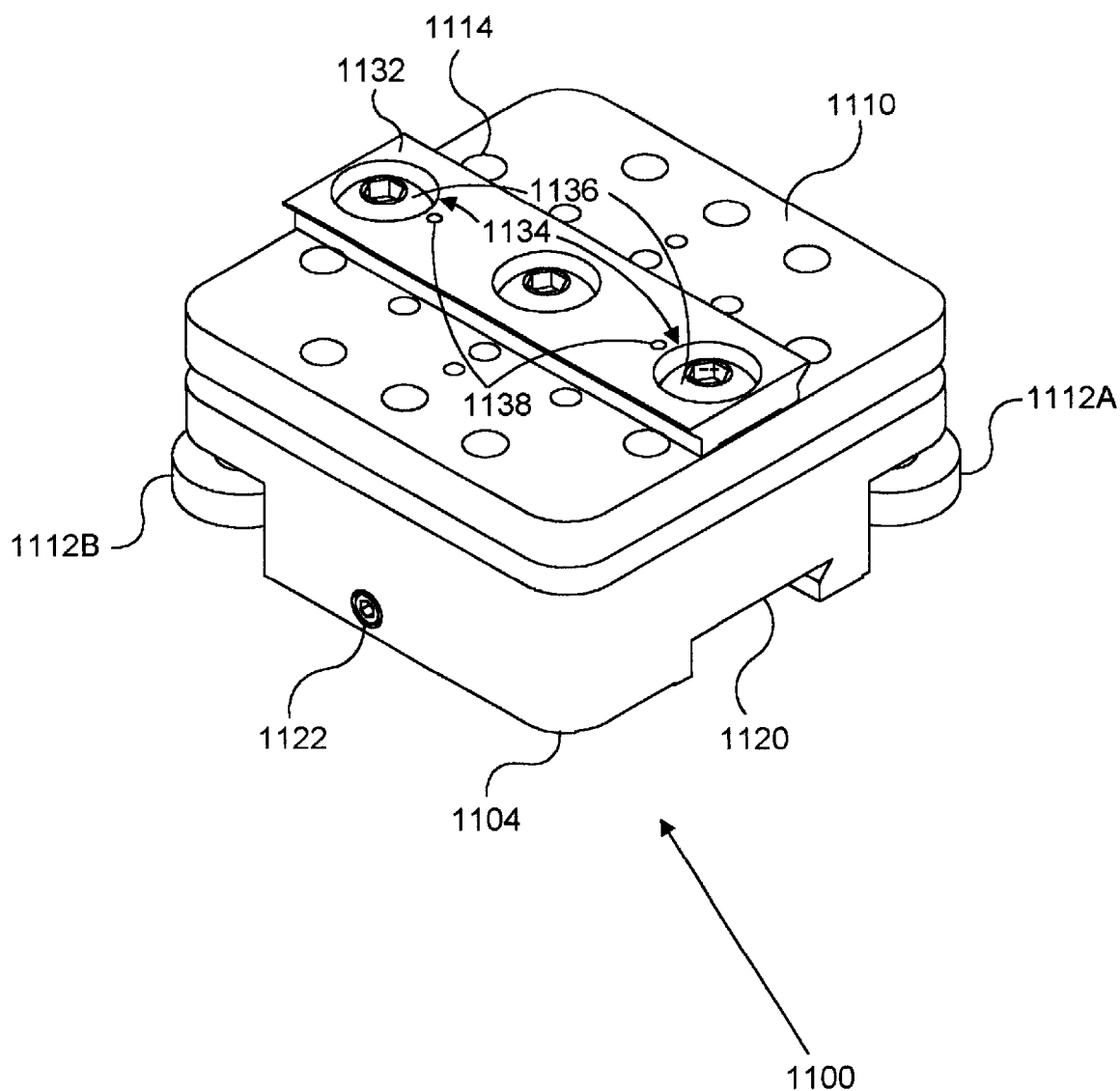
FIG. 11 is an isometric view of a modular planarizing stage which provides rotation and translation.

FIG. 11 shows an alternate embodiment of the current invention in which a planarizing motion module 1100 is shown. The planarizing motion module has a kinematic design in which combinations of rotation and translation can be produced by adjusting each of the three kinematic adjustment screws which position the base 1104 with respect to the translation stage 1110. The planarizing motion module 1100 has a base 1104 and a mobile planarization stage 1110. The base 1104 defines on a lower surface thereof, a female dovetail 1120. The base includes a dovetail set screw 1122 and additionally three kinematic adjustment screws of which 1112A–B are referenced. The mobile planarizing stage 1110 includes mounting holes 1114 and a male dovetail 1132. The male dovetail includes counterbore holes 1134 into which are placed mounting bolts 1136 to rigidly affix the male dovetail to the upper surface of the mobile planarizing stage 1110. Alignment pin holes 11389, in the dovetail and mobile planarizing stage allow the dovetail to be precisely positioned with respect to the mobile planarizing stage.

In operation a female dovetail 1120 is placed astride a male dovetail of another motion module. By torquing dovetail set screw 1122 planarizing motion module 1100 can be rigidly affixed to a neighboring motion module. Similarly, another motion module can be clamped to the upper surface of the mobile planarizing stage 1110 by means of the cooperative action between provided by the male dovetail 1132 and a female dovetail element on the motion module to be mounted.

Figure 12:
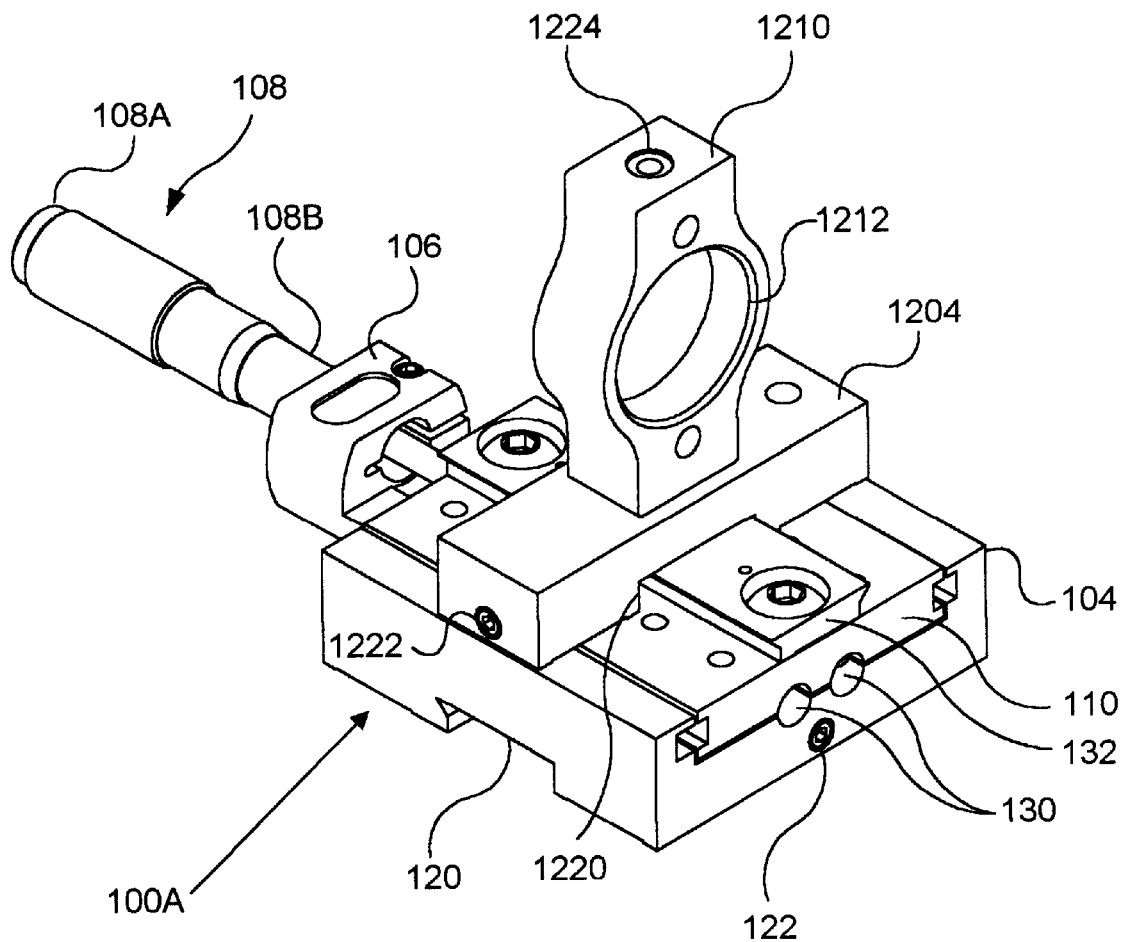
FIG. 12 is an isometric view of a modular translation stage and optic fixture.

FIG. 12 shows the first translational motion module 100A and a holder 1210 for an optic element rigidly affixed thereto. The optic element includes a base portion 1204 in which is defined a female dovetail 1220. The base additionally includes a dovetail set screw 1222. The optic holder portion 1210 is rigidly affixed to the base 1204. The optic holder includes a circular counterbore 1212 in which an optic element such as a mirror or lens may be positioned. The mirror or lenses can be rigidly clamped within the bore by means of a set screw 1224 which is positioned radially within the optic holder 1210 with respect to the counterbore 1212.

The base 1204 of the optic element holder 1210 and specifically the female dovetail 1220 defined therein is set astride a male dovetail 132 which is in turn affixed to the upper surface of mobile translation stage 110. Next, the dovetail set screw 1222 is torqued until its tip engages in outward sloping surface of male dovetail 132 and causes an opposing outward sloping surface of that dovetail to engage an inward sloping surface of female dovetail 1220. Thus, the optic element holder and base are rigidly fastened to the mobile translation stage 110.

In operation clockwise and counter clockwise rotation of the rotary portion 108A of positioner handle 108 causes the optic element to translate along the X-axis.

Figure 13:
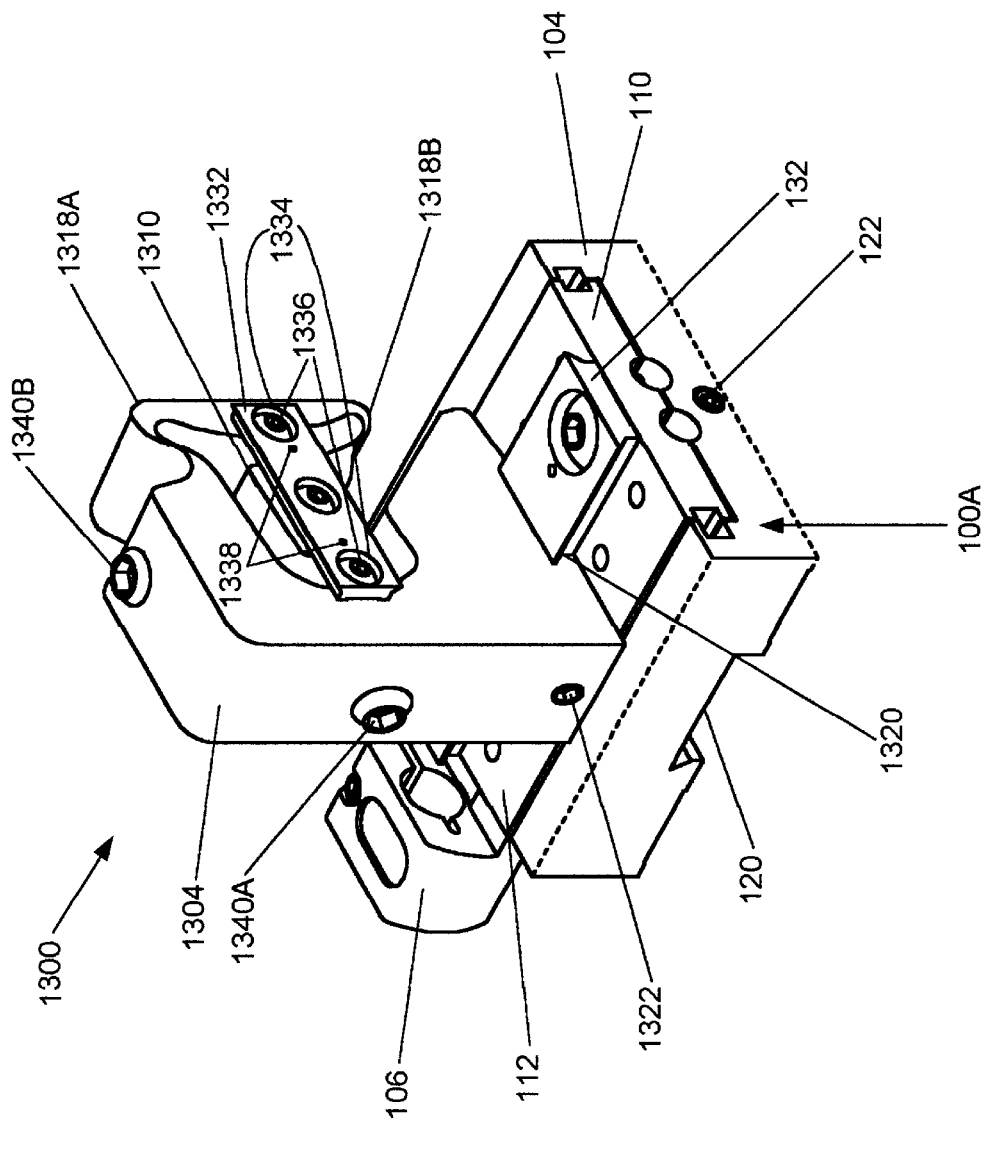
FIG. 13 is an isometric view of a multi-axis linear-rotational motion module affixed to a single-axis linear motion module.

FIG. 13 is an isometric view of a multi-axis linear-rotational motion module 1300 mounted on a single axis linear motion module 100A. Linear motion modular 100A includes, as discussed above, a base 104A and a mobile stage 110. The base 104A includes a female dovetail 120 and a set screw 122. The base also includes a positioner clamp 106. The mobile stage 110 includes an upper face 112 and a male dove tail 132. The male dove tail 132 is rigidly fixed to the upper face 112 of the mobile stage 110.

The multi-axis linear-rotational motion module 1300 includes a base 1304, and a stage 1310. The base includes a female dovetail 1320, a set screw, 1322, and positioning screws 1340A–B. The mobile stage 1310 includes male dovetail 1332. The male dovetail includes counterbores 1334, mounting bolts 1336 and alignment pins 1338.

The mobile stage 1310 is attached to the base 1304 by flex members 1318A–B. The mobile stage 1310 is positionable with respect to the base 1304 along either or both the X-Z axes. The positioning if the mobile stage 1310 is accomplished by means of positioning screws 1340A–B positioned along orthogonal axes through base 1304 which axes intersect mobile stage 1310.

To assemble the multi-axis linear-rotational motion module 1300 to the single axis linear motion module 100A, the female dovetail 1320 of motion module 1300 is placed astride male dovetail 132. The torsioning of set screw 1322 results in the clamping action produced by the tip of the set screw 1322 and the opposing surfaces of the male dovetail 132 and the female dovetail 1320. This results in the fastening of motion module 1300 to the motion module 100A. The assembly comprising the two motion modules allows positioning of the stage 1310 on any one or all of the X-Y-Z axes.

As will be obvious to those skilled in the art, other multi-axis motion modules can be fabricated which produce linear-linear, linear-rotational, and rotational-rotational motion. These modules can be equipped, with the interlocking feature of the current invention to allow their combination with other motion modules for multi-axis positioning of objects.

Although the forgoing invention has been described in detail for purposes of clarity of understanding, it will be obvious that certain, modifications may be practiced within the scope of the appended claims.

What is claimed is:

1. A modular motion module, comprising:
   a base With a bottom surface,
   a mobile stage with an exterior surface, and the mobile stage rotatably coupled to said base to provide rotational positioning of the exterior surface with respect to said base;

a female interlocking member defined on a one of the bottom surface of said base and the exterior surface of said mobile stage; and a male interlocking member for removably coupling to an other of the bottom surface of said base and the exterior surface of said mobile stage; and the male and female interlocking members dimensioned for interlocking with complementary female and male interlocking members of other motion modules for interchangeable stackable interconnection there between and for a coarse adjustment of a relative position between motion modules.

2. The motion module of claim 1, wherein said mobile stage comprise:

a rotary platform rotatably affixed to said base for rotational positioning with respect to said base.

3. The motion module of claim 1, where said male and female interlocking members comprises:

a male dovetail and a female dovetail respectively.

4. The motion module of claim 3, further comprising:

a fastener for removably fastening said male dovetail to one of the exterior surface of said mobile stage and the bottom surface of said base.

5. A modular motion module, comprising:

a base with a bottom surface, a mobile stage with an exterior surface; and the mobile stage coupled to said base in one of a rotary positionable and a linearly positionable relationship to allow a corresponding one of a rotary and a linear positioning of the exterior surface with respect to said base; and a female interlocking member defined on a one of the bottom surface of said base and the exterior surface of said mobile stage; and a male interlocking member for removably coupling to an other of the bottom surface of said base and the exterior surface of said mobile stage; and the male and female interlocking members dimensioned for interlocking with complementary female and male interlocking members of other motion modules for interchangeable stackable interconnection there between and for a coarse adjustment of a relative position between motion modules.

6. The modular motion module of claim 5, wherein said mobile stage further comprises:

a rotary bearing rotatably affixing said mobile stage to said base to allow rotary positioning of said mobile stage with respect to said base.

7. The modular motion module of claim 5, wherein said mobile stage further comprises:

a linear bearing slidably affixing said mobile stage to said base to allow linear positioning of said mobile stage with respect to said base.

8. The modular motion module of claim 5, further comprising:

a micropositioner coupled to at least one of said base and said mobile stage for a fine adjustment of a relative position between said base and said mobile stage.

9. The modular motion module of claim 5, wherein said mobile stage further comprises:

a kinematic coupling kinematically affixing said mobile stage to said base to allow both rotational and translational positioning of said mobile stage with respect to said base.

10. The modular motion module of claim 5, wherein said male and female interlocking members further comprise:

a male dovetail and a female dovetail, respectively.

11. The modular motion module of claim 10, further comprising:

a fastener for removably fastening said male dovetail to one of the exterior surface of said mobile stage and the bottom surface of said base.

12. An assembly of modular motion modules, for positioning objects, and the assembly of modular motion modules comprising:

at least a first motion module and a second motion module each including:

A) a base With a bottom surface;

B) a mobile stage with an exterior surface; and the mobile stage coupled to said base in one of a rotary positionable and a linearly positionable relationship to allow a corresponding one of a rotary and a linear positioning of the exterior surface with respect to said base; and C) a female interlocking member defined on a one of the bottom surface of said base and the exterior surface of said mobile stage; and D) a male interlocking member for removably coupling to an other of the bottom surface of said base and the exterior surface of said mobile stag;, and the male and female interlocking members dimensioned for interlocking with complementary female and male interlocking members of other motion modules for interchangeable stackable interconnection thee between and for a coarse adjustment of a relative position between motion modules.

13. The assembly of modular motion modules of claim 12, wherein at least one of said first motion module and said second motion module further comprises:

a rotary bearing rotatably affixing said mobile stage to said base to allow rotary positioning of said mobile stage with respect to said base.

14. The assembly of modular motion modules of claim 12, wherein at least one of said first motion module and said second motion module further comprises:

a linear bearing slidably affixing said mobile stage to said base to allow linear positioning of said mobile stage with respect to said base.

15. The assembly of modular motion modules of claim 14, wherein the at least one of said first motion module and said second motion module further comprises:

a micropositioner coupled to at least one of said base and said mobile stage for a fine adjustment of a relative position between said base an said mobile stage.

16. The assembly of modular motion modules of claim 12, wherein at least one of said first motion module and said second motion module further comprises:

a kinematic coupling kinematically affixing said mobile stage to said base to allow both rotational and translational positioning of said mobile stage with respect to said base.

17. The assembly of modular motion modules of claim 12, wherein said male and female interlocking members further comprise:

a male dovetail and a female dovetail, respectively.

18. The assembly of modular motion modules of claim 17, wherein at least one of said first motion module and said second motion module further comprises:

a fastener for removably fastening said male dovetail to one of the exterior surface of said mobile stage and the bottom surface of said base.

19. A modular motion module, comprising:

base means for supportably coupling with a stage;

mobile stage means for coupling with said base means, said mobile stage means adjustably coupling to said base means in one of a rotary positionable and a linearly positionable relationship to allow a corresponding one of a rotary and a linear positioning of said mobile stage means with respect to said base;

a first interlocking means defined on a one of the base and the mobile stage; and a second interlocking means, removably coupled to another of the base and the mobile stage and the first and second interlocking means for removably interlocking with second and first interlocking means respectively of other motion modules for interchangeable stackable interconnection there between.

20. The modular motion module of claim 19, wherein said mobile stage further comprises:

a rotary bearing means for rotatably affixing said mobile stage means to said base means to allow rotary positioning of said mobile stage means with respect to said base means.

21. The modular motion module of claim 19, wherein said first and second interlocking means comprise:

a female dovetail and a male dovetail, respectively.

22. The modular motion module of claim 21, the further comprising:

fastening means for removably fastening said male dovetail to one of the mobile stage means and the base means.

* * * * *